(12) United States Patent
Matsumori et al.

(10) Patent No.: US 7,742,138 B2
(45) Date of Patent: *Jun. 22, 2010

(54) LIQUID CRYSTAL DISPLAY

(75) Inventors: Masaki Matsumori, Hitachi (JP);
Yasushi Tomioka, Hitachinaka (JP);
Shigeru Matsuyama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 962 days.

This patent is subject to a terminal disclaimer.

(21) Appl. No.: 11/147,954

(22) Filed: Jun. 7, 2005

(65) Prior Publication Data

US 2005/0271833 A1 Dec. 8, 2005

(30) Foreign Application Priority Data

Jun. 8, 2004 (JP) .............................. 2004-169445

(51) Int. Cl.
*G02F 1/1337* (2006.01)
*G02F 1/1343* (2006.01)
*G03C 1/73* (2006.01)
*G03C 1/74* (2006.01)
*C09K 19/02* (2006.01)

(52) U.S. Cl. ...................... 349/123; 349/143; 428/1.25; 428/1.26; 252/501.1; 252/600

(58) Field of Classification Search ............ 252/299.01, 252/299.3, 501.1, 600; 428/1.1, 1.2, 1.25, 428/1.26, 1.3, 123, 143; 349/123, 143
See application file for complete search history.

(56) References Cited

U.S. PATENT DOCUMENTS 6,242,060 B1 * 6/2001 Yoneya et al. .............. 428/1.23

2001/0012081 A1 * 8/2001 Chaudhari et al. .......... 349/123
2001/0048498 A1 * 12/2001 Tomioka et al. ............. 349/123

(Continued)

FOREIGN PATENT DOCUMENTS

JP 05249473 A 9/1993

(Continued)

OTHER PUBLICATIONS

Gibbons, et al., "Surface-Mediated Alignment of Nematic Liquid Crystals with Polarized Laser Light", Research Center, Hercules Incorporated, USA, Nature, vol. 351, May 1991, pp. 49-50.

*Primary Examiner*—Shean C Wu
(74) *Attorney, Agent, or Firm*—Hogan Lovells US LLP

(57) ABSTRACT

It is an object to provide a liquid crystal display which reduces unsatisfactory display caused by distorted initial alignment direction in a liquid crystal alignment layer for IPS type displays, realizes stable liquid crystal alignment, is high in mass-productivity, and produces high-quality images of increased contrast ratio. The liquid crystal display contains alignment layers 109 placed between a pair of substrates 101 and 102, at least one of which is transparent, liquid crystal layer 110' sealed between the alignment layers, common electrode 103 and source electrode 105 for applying an electrical field to the liquid crystal layer, thin-film transistors connected to each of these electrodes, polarizer plate 114 provided on at least one of the substrates, wherein at least one of the alignment layers 109 is composed of a photo-reactive polyimide and/or polyamic acid which can be provided with a liquid crystal alignment capacity by being irradiated with essentially linearly polarized light.

11 Claims, 8 Drawing Sheets

U.S. PATENT DOCUMENTS

| | | |
|---|---|---|
| 2003/0179333 A1* | 9/2003 | Kim .......................... 349/139 |
| 2005/0088598 A1 | 4/2005 | Matsumori et al. |
| 2006/0061719 A1 | 3/2006 | Tomioka et al. |

FOREIGN PATENT DOCUMENTS

| | | |
|---|---|---|
| JP | 11-218765 | 8/1999 |
| JP | 11-231322 | 8/1999 |
| JP | 2003073471 A | 3/2003 |
| JP | 2004206091 A | 7/2004 |

* cited by examiner

//LIQUID CRYSTAL DISPLAY

FIELD OF THE INVENTION

The present invention relates to a liquid crystal display to which a photo-alignment method is applied.

BACKGROUND OF THE INVENTION

A liquid crystal display generally works by applying an electrical field to liquid crystal molecules in a liquid crystal layer placed between a pair of substrates to change a direction of the molecules to which they are aligned and thereby change optical characteristics of the liquid crystal layer.

A liquid crystal display provided with a switching element, e.g., thin-film transistor, for each pixel, has an electrode at each of a pair of substrates which hold a liquid crystal layer in-between, and is designed to apply an electrical field to the layer in a direction essentially perpendicular to the substrate interface. This type of display, known as the so-called actively driven display, is represented by a twisted nematic (TN) display which works on optical rotation of the liquid crystal molecules constituting the liquid crystal layer. One of the largest disadvantages to be solved for this type of display is narrow viewing angle.

On the other hand, an IPS type display has been developed. It works on birefringence produced in the liquid crystal layer by its liquid crystal molecules rotating essentially in parallel to the substrate, where an electrical field generated by an inter-digital electrode provided on one of a pair of the substrates is designed to have a component running essentially in parallel to the substrate surface. This type of display, disclosed by, e.g., Patent Documents 1 and 2, has been offering promising prospects as a novel display which can replace the conventional TN type, because of its advantages in, e.g., wider viewing angle and lower-load capacity, resulting from in-plane switching of the liquid crystal molecules, and hence rapidly advancing recently.

Patent Document 1 discloses a liquid crystal display which has an aligned film placed between spacer beads and a liquid crystal display, and is made of a material capable of exhibiting a liquid crystal alignment capacity when irradiated with polarized light to secure a contrast of up to 320. Patent Document 2 discloses a liquid crystal display which irradiates a high-molecular-weight film with linear polarized light to secure a contrast of up to 250.

The IPS type liquid crystal display is a promising technique for monitors and TV sets of large display area, because of its excellent viewing angle characteristics (e.g., contrast ratio and tone/hue reversal) and bright images it produces. This type of display is hereinafter referred to as "IPS-TFT-LCD."

A liquid crystal display is provided with a liquid crystal alignment layer having a liquid crystal alignment capacity in the interface between each of a pair of substrates and liquid crystal display placed between these substrates. For an IPS-TFT-LCD to be commercialized for large display areas (20-inch type or larger), however, it is necessary to develop a novel structure and process which allow uniform alignment treatment over the large display area (large-size panel).

Uniform alignment treatment of a liquid crystal alignment layer over a large area is difficult, in particular for an IPS-TFT-LCD, which has a number of stepped structures on a surface facing the liquid crystal layer. This type of display has a significantly narrower margin for alignment treatment of a liquid crystal alignment layer than a conventional TN type, in particular a normally open type displaying bright images at a low voltage and dark images at a high voltage, which is now a prevailing type. The narrower margin comes from the following reasons (1) to (3), described below.

(1) Stepped Structure

An IPS-TFT-LCD should have a number of elongate electrodes several microns wide (sometimes referred to as inter-digital electrode) for its working principle. As a result, it has a number of fine stepped structures.

The step size, determined by thickness of the electrode and shape of a varying film formed on the electrode, is normally 10 nm or more. A high-transmittance pixel structure has a thick inorganic insulation film, and stepped irregularities thinner than the inorganic film are flattened to some extent.

Therefore, the steps on a liquid crystal alignment layer in a high-transmittance pixel structure mainly come from the electrodes on an organic insulation film, where a liquid crystal alignment layer (sometimes referred to as aligned layer) of high-molecular weight compound, e.g., polyimide, serves as the uppermost film.

A conventional mass production technique rubs a liquid crystal alignment layer to impart a liquid crystal alignment capacity (initial alignment) thereto. Rubbing cloth is composed of fine fibers, about 10 to 30 μm thick, tied in bundles. Essentially, each of these fine fibers locally gives a shear force to the aligned layer to realize a liquid crystal alignment capacity.

There are very fine fibers, about several microns thick. These fibers, however, have not been commercially used for rubbing cloth, because the fibers are required to have a rigidity to realize a frictional force to some extent.

An IPS-TFT-LCD has electrodes arranged at intervals of the same order of the fiber thickness, i.e., about 10 to 30 μm, and cannot be sufficiently rubbed in the vicinity or the steps. Therefore, its alignment tends to be distorted. The distorted alignment will deteriorate image quality resulting from increased black level, which in turn results in decreased contrast ratio and uneven brightness.

(2) Alignment Angle

An IPS-TFT-LCD should have an initial alignment direction deviated by a certain angle or more from the direction perpendicular to or in parallel to the electrode extending direction, because of its working principle. The electrode may be an electrode for a signal interconnection, common electrode in a pixel, or pixel electrode.

In order to set an initial alignment direction by rubbing, it is necessary to rub the aligned layer with about 10 to 30 μm thick fibers in a given angle direction, as discussed above. These fibers, however, are dragged from a given angle towards the step in the presence of an interconnection and the step at the end of the interconnection, where the interconnection contains a signal-transmitting electrode, common electrode in a pixel or pixel electrode, extending in a certain direction, to distort the alignment and thereby deteriorate image quality resulting from decreased black level or the like.

(3) Lower Black Level

Efficient lower black level (black display) is one of the characteristics of an IPS-TFT-LCD. As a result, distorted alignment in this type of display is more visible than in others.

A conventional normally open type TN display produces a black level (dark level) at a high voltage. The dark level is determined by the relationship between liquid crystal molecule disposition and polarizer plate position, because most of the molecules are aligned in the electrical field direction, which is perpendicular to the substrate surface, at a high voltage. Therefore, uniformity of the dark level is rather insensitive to the initial alignment condition at a low voltage for its working principle.

The human eye recognizes uneven brightness as relative brightness ratio, which changes essentially on a logarithmic scale. It is therefore sensitive to dark level changes. A conventional normally open type TN display, which forcibly aligns the liquid crystal molecules in one direction at a high voltage, is more advantageous than an IPS-TFT-LCD also in this respect, because it is less sensitive to the initial alignment condition.

On the other hand, an IPS-TFT-LCD produces a dark level at a low or zero voltage, and is more sensitive to the distorted initial alignment condition. In particular, polarized light entering a liquid crystal layer runs with the linear component kept essentially undistorted in the birefringence mode, where liquid crystal molecules are aligned in parallel to each other on the upper and lower substrates (homogeneous alignment), and the light transmission axis in one polarizer plate is set in parallel to the liquid crystal alignment direction and that in the other plate perpendicular to the alignment direction. This design is effective for subduction of the dark level. Transmittance T in the birefringence mode is generally represented by the following formula:

$$T=T_0 \cdot \sin^2\{2\theta(E)\} \cdot \sin^2\{(\pi \cdot d_{\mathit{eff}} \cdot \Delta n)/\lambda\}$$

Wherein, $T_o$ is a coefficient mainly determined by transmittance of the polarizer plate for the liquid crystal panel, $\theta(E)$ is angle between alignment direction of the liquid crystal molecules (effective optical axis of a liquid crystal layer) and polarized light transmission axis, E is intensity of the electrical field applied, $d_{\mathit{eff}}$ is effective thickness of the liquid crystal layer, $\Delta n$ is anisotropy of refractive index, and $\lambda$ is light wavelength.

The product of effective liquid crystal layer thickness $d_{\mathit{eff}}$ and liquid crystal refractive index anisotropy $\Delta n$, i.e., $d_{\mathit{eff}} \cdot \Delta n$, is defined as retardation. It should be noted that liquid crystal layer thickness $d_{\mathit{eff}}$ is not thickness of the whole liquid crystal layer but the liquid crystal layer portion actually changing in alignment direction in an electrical field.

Because, no change in alignment direction occurs in the liquid crystal molecules in the vicinity of the liquid crystal layer interface, even when a voltage is applied thereto, due to the anchoring effect at the interface. Therefore, the relationship $d_{\mathit{eff}} < d_{LC}$ invariably holds, wherein $d_{LC}$ is thickness of the whole liquid crystal layer placed between the substrates. The difference between them can be estimated at about 20 to 40 nm, although varying depending on type of the interface in which a liquid crystal panel material and the liquid crystal layer are in contact with each other, e.g., on type of aligned layer material.

Referring to the above formula, $\sin^2\{2\theta(E)\}$ is the term which depends on electrical field intensity. This means that brightness can be controlled by changing electrical field intensity E in accordance with the angle $\theta$.

A polarizer plate for a normally closed type display is set in such a way to keep the angle $\theta$ at 0 when no voltage is applied, which makes the display sensitive to distortion of the initial alignment direction.

As discussed above, uniformity of alignment is an essential parameter for IPS-TFT-LCDs, which has clarified problems involved in the current rubbing method.

The rubbing alignment treatment generally involves various problems, e.g., TFT failure caused by friction-generated static electricity, unsatisfactory display caused by distorted alignment, which results from distorted ends of fibers for rubbing cloth, or dust, and frequently required exchange of rubbing cloth.

The so-called rubbingless alignment, which produces aligned liquid crystal molecules without using rubbing, has been studied to avoid the problems involved in rubbing treatment, and various approaches have been proposed. One of these approaches is photo-alignment, where a high-molecular-weight film is irradiated with polarized ultraviolet ray.

For example, a method disclosed by Non-patent Document 1 is characterized by aligning liquid crystal molecules in one direction with polarized light while dispensing with rubbing treatment adopted in conventional methods.

The photo-alignment has been attracting attention as a novel liquid crystal alignment approach involving no rubbing treatment for its several advantages, e.g., dissolved problems associated with rubbing treatment (e.g., scratches left on the treated film surface, and those caused by static electricity), and simplified process in consideration of commercial production.

High-molecular-weight compounds have been proposed as materials for films with aligned liquid crystal molecules. They have a photo-reactive group introduced into the side chain for necessity of securing photochemical sensitiveness to polarized light.

Polyvinyl cinnamate may be cited as one of the representative high-molecular-weight compounds. It is considered to exhibit anisotropy in the film of the high-molecular-weight compound to align the liquid crystal molecules, when irradiated with light to dimerize the side chain.

Another example proposed so far is a film of high-molecular-weight compound dispersed with a low-molecular-weight dichroic azo dye, where the film is irradiated with polarized light to align the liquid crystal molecules in one direction.

A still another example is a specific polyimide, where the film is irradiated with polarized ultraviolet ray or the like to align the liquid crystal molecules. The liquid crystal alignment is considered to occur, because the main polyimide chains extending in one direction are decomposed when irradiated with light.

Patent Document 1: JP Patent No. 3,303,766

Patent Document 2: JP-A-11-218765

Non-patent Document 1: W. M. Gibbons, et. al., Nature, vol. 351, 49 (1991)

BRIEF SUMMARY OF THE INVENTION

As discussed above, photo-alignment has been proposed and studied as one of the rubbingless alignment approaches to solve the problems involved in rubbing alignment. However, it involves the following problems viewed from commercial application.

The high-molecular-weight compounds, represented by polyvinyl cinnamate, having a high-molecular-weight-side chain into which a photo-reactive group is introduced, are not sufficiently reliable for commercial purposes, because of insufficient thermal stability of the aligned molecules.

Moreover, they are not always suitable for realizing strong alignment by aligning the liquid crystal molecules more uniformly, because the high-molecular-weight side chain is considered to work as the structural portion responsible for liquid crystal alignment.

Still more, a film of high-molecular-weight compound dispersed with a low-molecular-weight dichroic azo dye involves problems resulting from insufficient heat and light resistance, because the dye responsible for liquid crystal alignment is itself low in molecular weight.

Still more, irradiation of a specific polyimide with polarized ultraviolet ray is difficult to secure sufficient reliability of the film for commercial purposes, because the alignment mechanism depends on light-induced decomposition of the compound, although polyimide itself is highly resistant to heat or the like.

It is necessary, therefore, not only to align the liquid crystal molecules in the initial stage but also to keep the alignment more stably for reliability of the film, when the alignment is to be realized with polarized light for commercial purposes.

Still more, it is desirable to select a high-molecular-weight compound stable also thermally for commercial application. In this light, the high-molecular-weight compounds proposed so far to be irradiated with light for liquid crystal alignment are not always sufficient in alignment capability and stability, leaving major problems to be solved before rubbingless alignment with light is commercialized.

It is an object of the present invention to provide a liquid crystal display, in particular a large size one, which can solve problems resulting from narrow production margin for alignment treatment as a major disadvantage characteristic of IPS-TFT-LCDs, reduce unsatisfactory display caused by distorted initial alignment direction, realize stable liquid crystal alignment, and produce high-quality images of increased contrast ratio.

It is another object of the present invention to provide a liquid crystal display of high mass-productivity and high quality/precision.

The present invention provides a liquid crystal display comprising:

a pair of substrates;

a liquid crystal layer placed between a pair of the electrodes;

electrodes provided on at least one of the substrates to apply an electrical field to the liquid crystal layer;

active elements each connected to each of the electrodes; and an alignment layer placed between the liquid crystal layer and at least one of the substrates, wherein the alignment layer is photo-reactive and comprises a photo-reactive polyimide or a photo-reactive polyimide and polyamic acid which is provided with a liquid crystal alignment capacity by being irradiated with light polarized essentially linearly, in order to achieve the above objects. Preferably, at least one of the pair of the electrodes is transparent and the liquid crystal display further comprises a polarizing means provided on at least one of the substrates and responding to molecular alignment conditions in the liquid crystal layer to change its optical characteristics.

Preferably, in the liquid crystal display of present invention, the electrical field to be applied to the liquid crystal layer has a component running essentially in parallel to the substrate surface.

Preferably, in the liquid crystal display of the present invention, liquid crystal molecules which constitute the liquid crystal layer, provided on the photo-reactive alignment layer, have a major axis extending in the direction in parallel to or perpendicular to a polarizing axis of light polarized essentially linearly. It is particularly preferable that the photo-reactive alignment layer contains a polyamic acid or polyimide composed of at least cyclobutanetetracarboxylic dianhydride or a derivative thereof as an acid anhydride and at least an aromatic diamine compound as a diamine.

It is preferable that the photo-reactive alignment layer contains a polyamic acid or polyimide containing, at least at 50%, the polyamic acid or polyimide repeating structures of cyclobutanetetracarboxylic dianhydride, a derivative thereof and aromatic diamine compound.

The cyclobutanetetracarboxylic dianhydride or derivative thereof are preferably represented by one of the general formulae [Compound 1] to [Compound 3]:

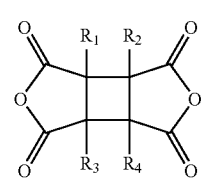

Compound 1

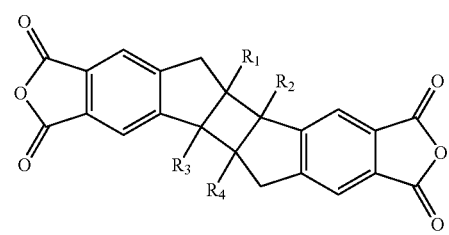

Compound 2

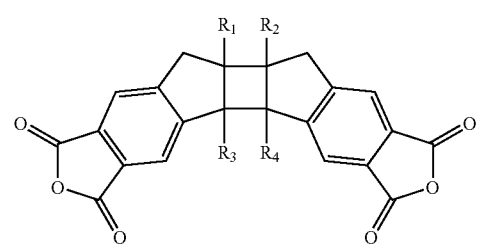

Compound 3

(wherein, $R_1$ to $R_4$ are independently hydrogen, fluorine, chlorine or bromine atom, phenyl group, an alkyl group or alkoxy group of 1 to 6 carbon atoms, vinyl group [—$(CH_2)_m$—CH=$CH_2$, m is 0, 1 or 2] or acetylene group [—$(CH_2)_m$—C≡CH, m is 0, 1 or 2] or acetyl group [—$(CH_2)_m$—CO—$CH_3$, m is 0, 1 or 2]).

The aromatic diamine compound preferably contains at least one species selected from the group consisting of those represented by the general formulae [Compound 4] to [Compound 22]:

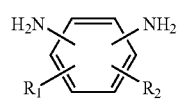

Compound 4

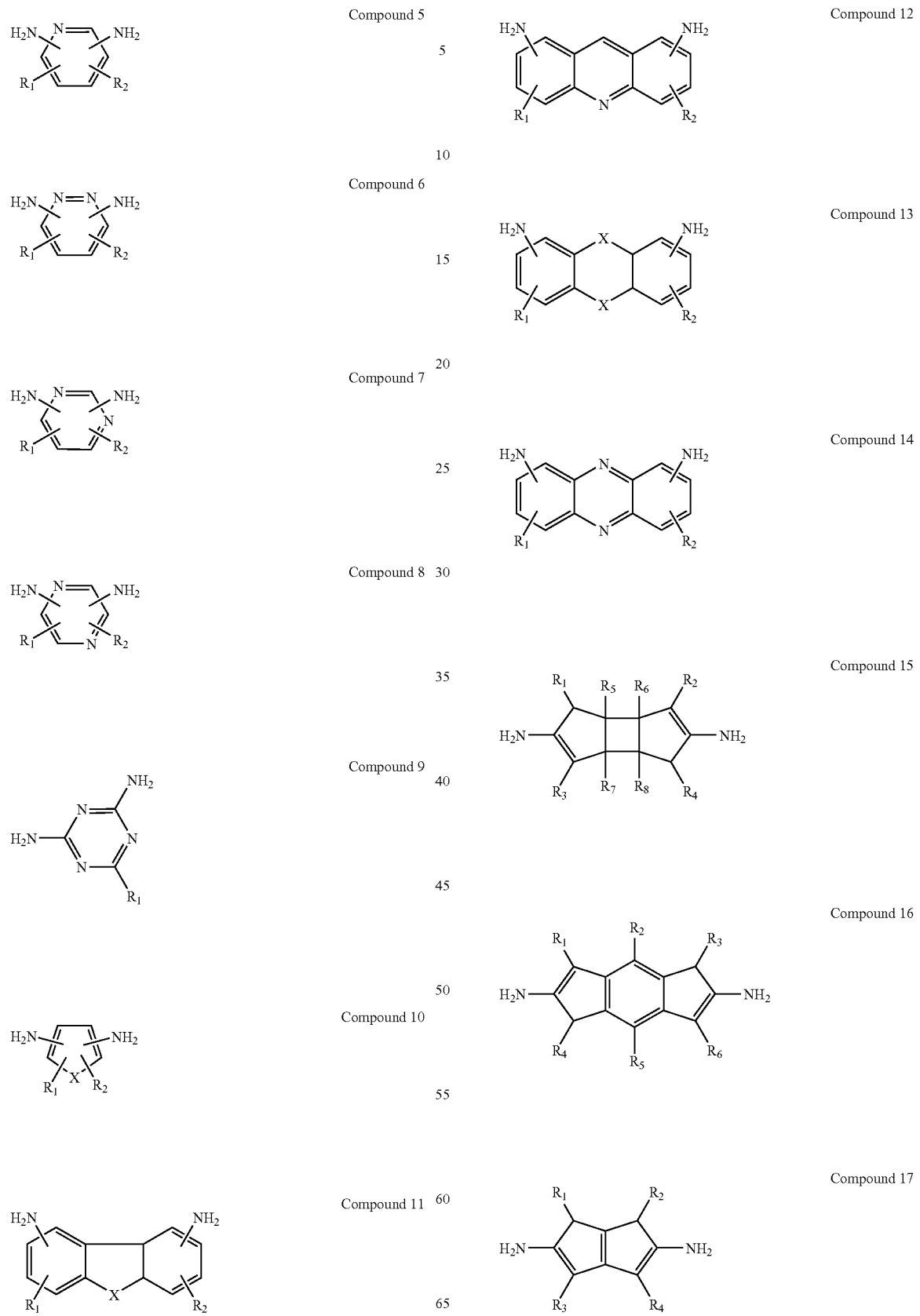

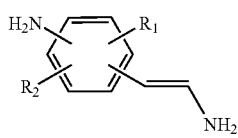

Compound 18

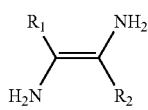

Compound 19

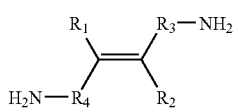

Compound 20

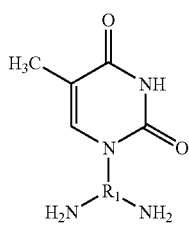

Compound 21

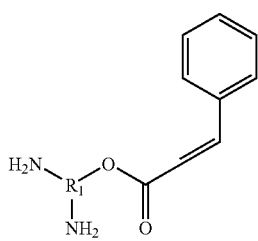

Compound 22

(wherein, $R_1$ to $R_8$ for Compounds 4 to 19 and $R_1$ and $R_2$ for Compound 20 are independently hydrogen, fluorine or chlorine atom, an alkyl group or alkoxy group of 1 to 6 carbon atoms, vinyl group [—$(CH_2)_m$—CH=$CH_2$, m is 0, 1 or 2] or acetylene group [—$(CH_2)_m$—C≡CH, m is 0, 1 or 2] or acetyl group [—$(CH_2)_m$—CO—$CH_3$, m is 0, 1 or 2]; X for Compounds 10 to 12 is —$CH_2$—, —NH—, —CO—, —O— or —S— as a coupling group; and $R_3$ and $R_4$ for Compound 20 and $R_1$ for Compounds 21 and 22 are independently an alkyl group of 1 to 6 carbon atoms).

Decreasing thickness of the alignment layer to 1 to 100 nm to have a thin film is effective, because of improved transmittance and efficiency of the photo-reactions accelerated by polarized light. It is also effective for the liquid crystal display in which the film is incorporated, because a voltage can be efficiently applied to the liquid crystal layer to drive the liquid crystal molecules therein.

Decreasing the thickness of the alignment layer to 1 to 50 nm, or further to 1 to 30 nm, is still more effective, because it can reduce the DC component (so-called residual DC voltage) remaining in the interface between the components of a pixel comprising an assembly of electrode/alignment layer/liquid crystal layer/alignment layer/electrode. This should lead to improved afterimage/image sticking characteristics.

Preferably, the liquid crystal layer has a pre-tilt angle of 1° or less. The conventional rubbing treatment may not always achieve satisfactory alignment, because the stepped end of the electrode works as a guide for the fibers in the rubbing cloth with the result that the fibers may be dragged in the direction in which the step extends or may not reach the step corner.

Preferably, in the present invention, the electrodes include a common electrode, a source electrode, a common electrode interconnection and a drain electrode.

The present invention is particularly effective when at least one of the source electrode, the common electrode and the common electrode interconnection is composed of a transparent electrode, because aligned conditions of the liquid crystal molecules are more noted in the vicinity of the electrode step.

Still more, the present invention works particularly effectively, when the transparent electrode is composed of an ion-doped titanium oxide film or an ion-doped zinc oxide (ZnO) film.

Preferably, at least one of the electrodes is composed of Al, Cr, Mo, Ta, W or an alloy containing at least one of these metals.

When the source electrode and the common electrode, which is opposite to the source electrode, are set in parallel to each other and have a zigzag bent structure, the film in which the liquid crystal molecules are aligned may not closely come into contact with an organic insulation film below. The conventional rubbing alignment treatment, when applied to the above structure, may cause unsatisfactory display resulting from troubles, e.g., exfoliation of the aligned layer. The present invention is effective for the above structure.

Still more, the present invention is particularly effective for the structure in which the common electrode and/or the source electrode are/is formed on an organic insulation film, and the photo-reactive alignment layer is formed on the organic insulation layer and the common and/or source electrode(s).

Preferably, in the present invention, liquid crystal molecules are aligned essentially in a same direction in two interfaces between the liquid crystal layer and the photo-reactive alignment layer.

The present invention is also characterized by the film irradiated with polarized light to align the liquid crystal molecules therein.

Preferably, the polarized light used for the alignment treatment has a light wavelength of 200 to 400 nm. Moreover, the present invention works still more efficiently when treated with at least two types of polarized light, one being essentially linearly polarized and the other having a different wavelength.

Preferably, the photo-reactive alignment layer has a glass transition temperature of 250° C. or higher.

The liquid crystal alignment capacity can be realized more efficiently for the liquid crystal alignment layer, when at least one type of treatment selected from heating or treatment with infrared, far-infrared, electron or radioactive ray is added to the treatment with polarized light. The additional treatment described above is effective for promoting or stabilizing the capacity, because it can accelerate reactions for realizing the capacity and induce cross-linking or the like.

The liquid crystal alignment capacity can be realized still more efficiently, when at least one type of the additional treatments is carried out to temporally overlap the treatment with polarized light.

Moreover, the liquid crystal alignment capacity can be also realized efficiently, when a thermal imidization treatment is carried out to temporally overlap the treatment with polarized light. In particular, the liquid crystal alignment layer is preferably kept at 100 to 400° C. during the treatment, more preferably 150 to 300° C., when at least one of the additional treatments is carried out in addition to the treatment with polarized light.

Heating or treatment with infrared or far-infrared ray is particularly effective, because it works also as a thermal imidization treatment of the liquid crystal alignment layer.

For the present invention, a desired (target) contrast ratio is 500/1 or more, and a desired (target) time in which an afterimage is dissolved, determined by the method defined below in the preferred embodiments, is 5 minutes or less. The present invention produces high-quality images having a target contrast ratio of 500/1 or more, and is subjected to a stricter standard for afterimage evaluation than a conventional display producing images having a lower target contrast ratio of about 200/1. Therefore, the target time in which an afterimage is dissolved is set at 5 minutes or less.

As discussed above, the present invention can provide a liquid crystal display which can solve problems resulting from narrow production margin for alignment treatment as an inherent disadvantage involved in IPS-TFT-LCDs, reduce unsatisfactory display caused by distorted initial alignment direction, realize stable liquid crystal alignment, and produce high-quality images of higher contrast ratio.

Other objects, features and advantages of the invention will become apparent from the following description of the embodiments of the invention taken in conjunction with the accompanying drawings.

Figure 1:
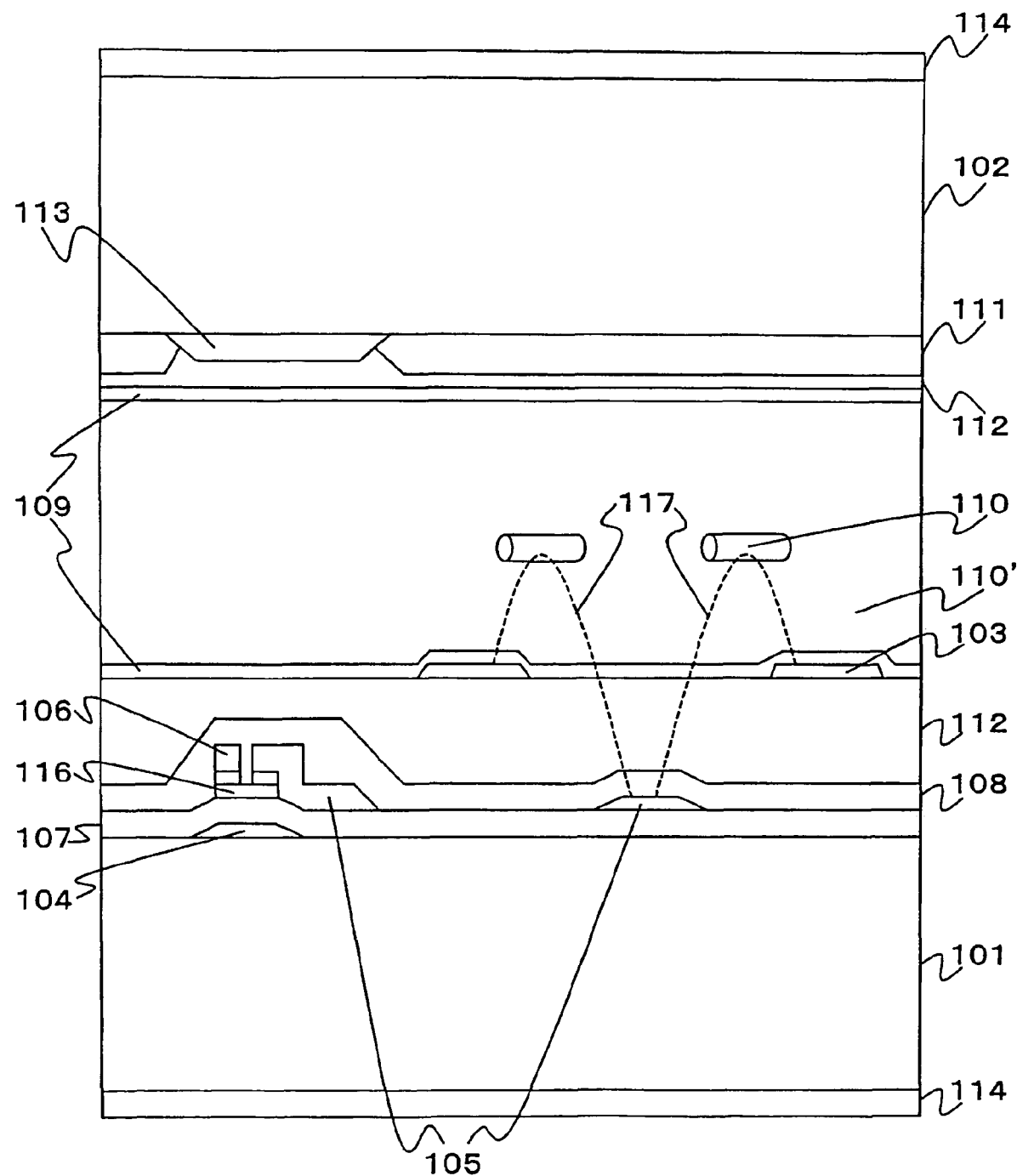
FIG. 1 is a cross-sectional view around the pixel for describing the pixel structure for the first embodiment of the liquid crystal display of the present invention.

DESCRIPTION OF REFERENCE NUMERALS 101, 102: Glass substrate, 103: Common electrode, 104: Scanning electrode (Gate electrode), 105: Pixel electrode (Source electrode), 106: Signal electrode (Drain electrode), 107: Gate insulation layer, 108: Protective insulation layer, 109: Alignment layer, 110: Liquid crystal molecule, 110': Liquid crystal layer (Liquid crystal composition layer), 111: Color filter, 112: Organic protective layer (Inter-layer insulation film), 113: Light-shielding film (Black matrix), 114: Polarizer plate, 116: Semiconductor film, 117: Electrical field direction, 118: Throughhole, 120: Common electrode interconnection

DETAILED DESCRIPTION OF THE INVENTION

The preferred embodiments of the present invention are described in detail by referring to the attached drawings. In the description below, the substrate on which an active element, e.g., thin-film transistor, is formed is referred to as the active matrix substrate. The opposite substrate facing the active matrix substrate is referred to as the color filter substrate, when provided with a color filter thereon.

For the present invention, a desired (target) contrast ratio is 500/1 or more, and a desired (target) time in which an afterimage is dissolved, determined by the method defined below in the preferred embodiments, is 5 minutes or less. The present invention produces high-quality images having a target contrast ratio of 500/1 or more, and is subjected to a stricter standard for afterimage evaluation than a conventional display producing images having a lower target contrast ratio of about 200/1. Therefore, the target time in which an afterimage is dissolved is set at 5 minutes or less.

FIG. 1 schematically illustrates a cross-section around a pixel for describing the first embodiment of the liquid crystal display of the present invention.

Figure 2:
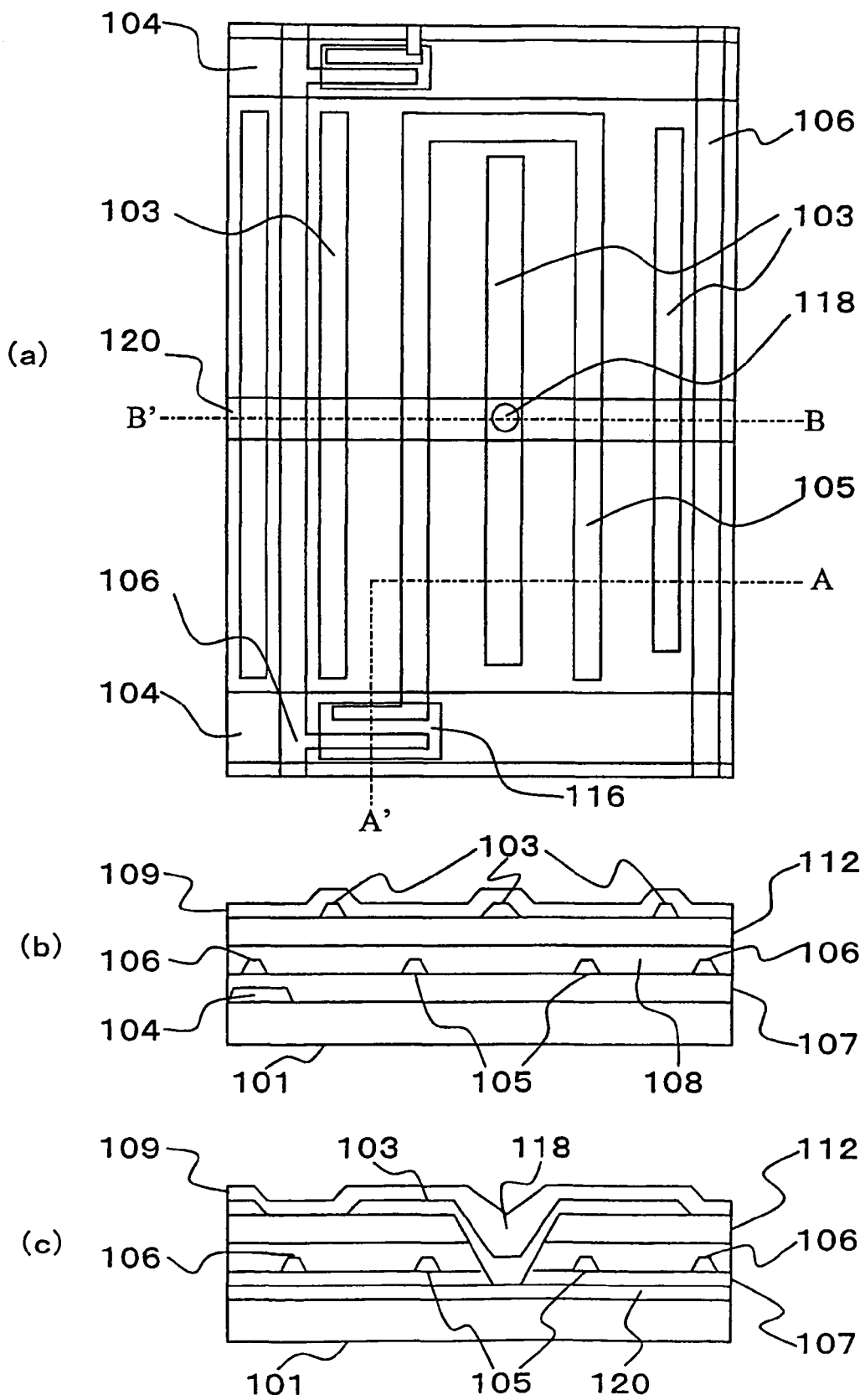
FIG. 2 presents a plan and cross-sectional views around the pixel for describing the pixel structure for the first embodiment of the liquid crystal display of the present invention.

FIG. 2 schematically illustrates an active matrix substrate structure around a pixel for describing the first embodiment of the liquid crystal display of the present invention, where FIG. 2 (a) is a plan view, and FIGS. 2 (b) and (c) are cross-sectional views of the display shown in FIG. 2 (a), cut along the line A-A' and line B-B', respectively.

The cross-sectional view shown in FIG. 1 partly corresponds to the view shown in FIG. 2 (a), cut along the line A-A'. It should be noted that the views shown in FIGS. 2 (b) and (c) outline the substantial part, and are not exactly corresponding to the sections cut along the line A-A' and line B-B' shown in FIG. 2 (a). For example, the semiconductor film 116 shown in FIG. 1 is omitted in FIG. 2 (b), and the throughholes by which the opposite electrode is connected to the common interconnection 120 is represented by one hole in FIG. 2 (c).

The liquid crystal display of the first embodiment of the present invention comprises the gate electrode (scanning signal electrode) 104 of chromium (Cr) and common electrode interconnection 120 (refer to FIG. 2), both formed on the glass substrate 101 as the active matrix substrate, and gate insulation film 107 of silicon nitride, formed in such a way to cover the gate electrode 104 and common electrode interconnection 120.

Moreover, the semiconductor film 116 of amorphous silicon or polysilicon is provided on the gate electrode 104 via the gate insulation film 107, to work as the active layer (active element) for a thin-film transistor (TFT).

Still more, the drain electrode 106 of chromium/molybdenum (Cr/Mo) in the image signal interconnection and source electrode (pixel electrode) 105 are provided in such a way to partly overlap the pattern on the semiconductor film 116. These electrodes are totally covered by the protective insulation film 108 of silicon nitride.

As schematically illustrated in FIG. 2 (c), the common electrode 103 is provided on the overcoat layer (organic protective film) 112 to be connected to the common electrode interconnection 120 via the through-hole 118 running through the gate insulation film 107 and protective insulation film 108.

Moreover, as illustrated in FIG. 2 (a), the common electrode 103 is provided. It is drawn from the common electrode interconnection 120 via the through-hole 118 in such a way to face the pixel electrode 105 in a pixel area in the planar view.

In the first embodiment of the present invention, therefore, the pixel electrode 105 is provided below the protective insulation film 108, which is located below the organic protective film 112, and the common electrode 103 is provided on the organic protective film 112. One pixel is formed between the pixel electrodes 105 and common electrodes 103.

The alignment layer 109 is provided on the active matrix substrate on which the unit pixels are arranged in a lattice pattern, i.e., on the organic protective film 112 on which the common electrode 103 is formed.

Still more, the color filter layer 111 is provided on the glass substrate 102 as the opposite substrate, as illustrated in FIG. 1. It is separated by the light-shielding layer (black matrix) 113 for each pixel. The color filter layer 111 and light-shielding layer 113 are covered with the organic protective film 112 of a transparent insulating material. The alignment layer 109 is provided also on the organic protective film 112 to constitute the color filter substrate.

The alignment layer 109 is provided with a liquid crystal alignment capacity by being irradiated with ultraviolet ray emitted from a high-pressure mercury lamp as the light source and linearly polarized by a laminate of quartz plates as a pile polarizer.

The glass substrates 101 and 102 as the active matrix and opposite substrates are provided to face each other on the alignment layer 109. They hold in-between the liquid crystal layer (liquid crystal composition layer) 110' composed of the liquid crystal molecules 110.

The polarizer plate 114 is provided on the external surface of each of the glass substrates 101 and 102 as the active matrix and opposite substrates.

The active matrix type liquid crystal display with thin-film transistors (TFT liquid crystal display) is thus produced.

In the TFT liquid crystal display, the liquid crystal molecules 110 which constitute the liquid crystal composition layer 110' are aligned in the direction essentially in parallel to the substrates 101 and 102 surfaces facing each other, when no electrical field is applied thereto, i.e., homogeneously aligned in the initial alignment direction as set by the photo-alignment treatment.

When a voltage is applied to the gate electrode 104 to switch the thin-film transistor (TFT) on, the electrical field 117 is applied to the liquid crystal composition layer 110' by the potential difference between the pixel electrode 105 and common electrode 103, and the liquid crystal molecules 110 which constitute the layer 110' change their alignment direction to align with the electrical field by the interactions between refractive anisotropy of the layer 110' and the electrical field. This changes light transmittance of the display by the actions of refractive anisotropy of the layer 110' and the polarizer plate 114, to display images.

The organic protective film 112 may be made of a thermosetting resin, e.g., acrylic, epoxyacrylic or polyimide resin, known for its high insulation capacity and transparency.

Moreover, the organic protective film 112 may be of a photocurable, transparent resin or inorganic material, e.g., polysiloxane resin. The organic protective film 112 may work also as the alignment layer 109.

As discussed above, the first embodiment of the present invention can align the liquid crystal molecules uniformly over the entire display area without causing local alignment distortion in the vicinity of the electrode by non-contacting photo-alignment instead of rubbing treatment which directly rubs the molecules with buffing cloth to produce a liquid crystal alignment capacity for the molecules.

Figure 3:
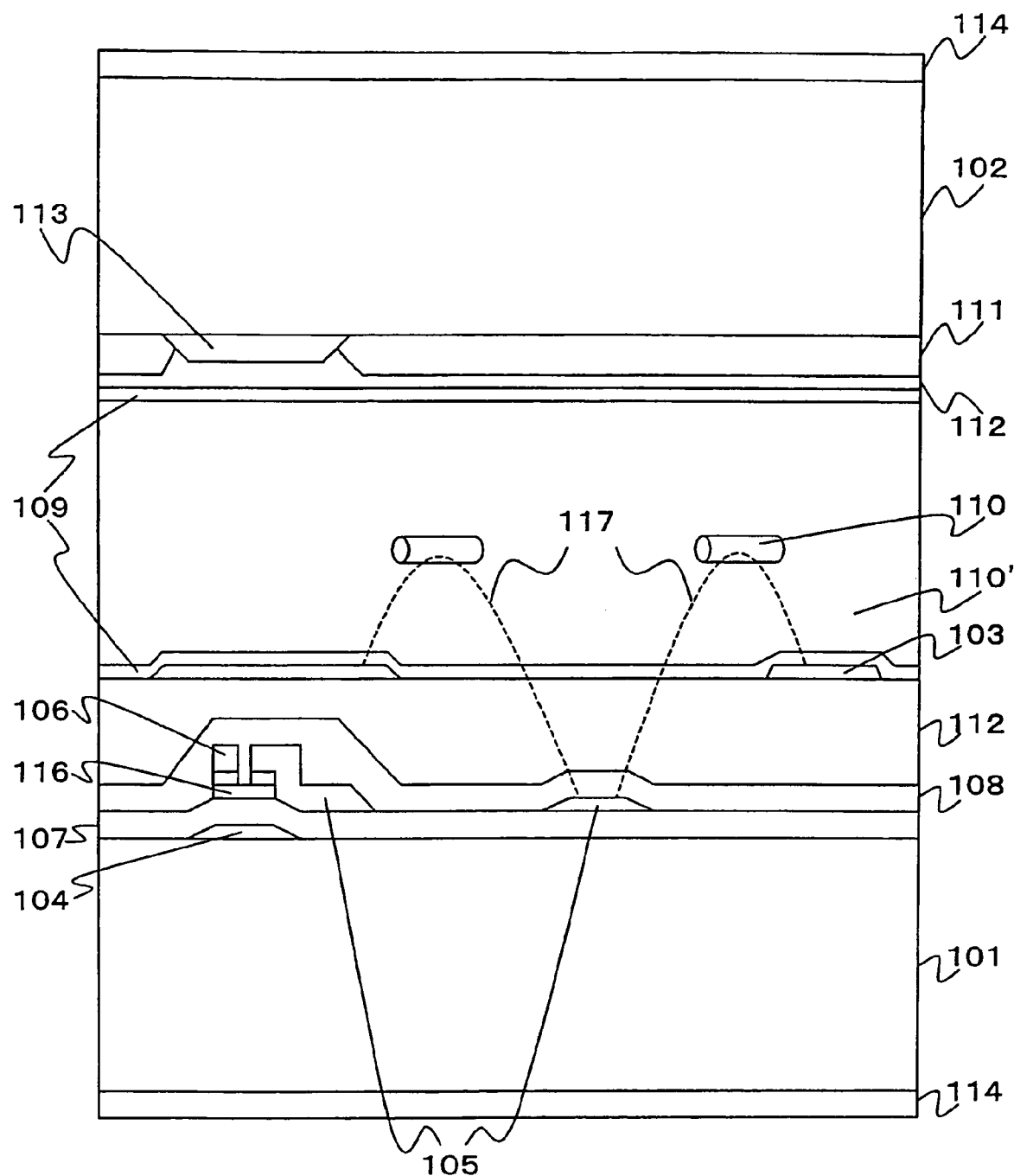
FIG. 3 is a cross-sectional view around the pixel for describing the pixel structure for the second embodiment of the liquid crystal display of the present invention.

Next, the liquid crystal display of the second embodiment of the present invention is described. FIG. 3 schematically illustrates a cross-section around a pixel for describing the second embodiment of the liquid crystal display of the present invention.

Figure 4:
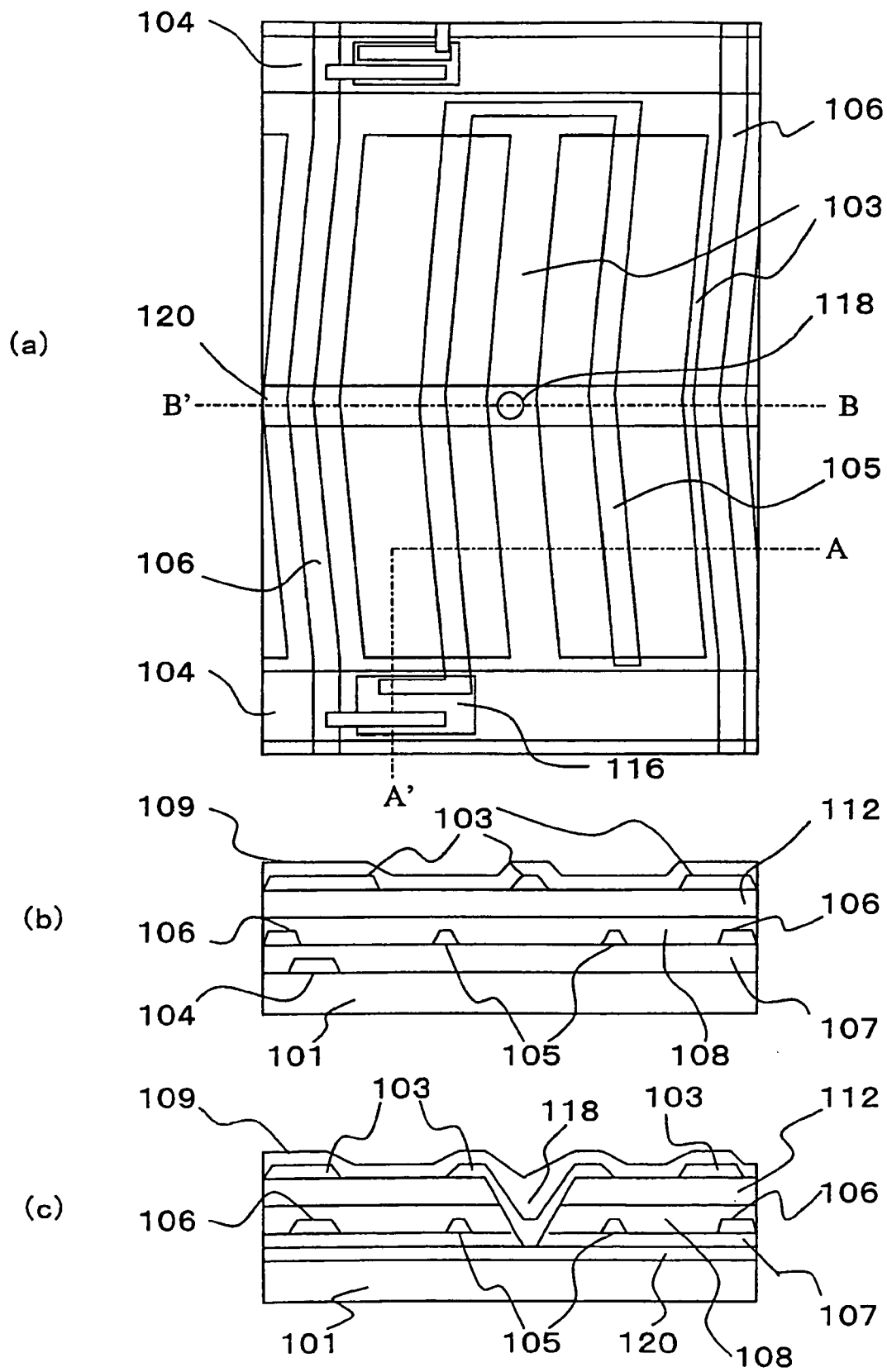
FIG. 4 presents a plan and cross-sectional views around the pixel for describing the pixel structure for the second embodiment of the liquid crystal display of the present invention.

FIG. 4 schematically illustrates an active matrix substrate structure around a pixel for describing the second embodiment of the liquid crystal display of the present invention, where FIG. 4 (a) is a plan view, and FIGS. 4 (b) and (c) are cross-sectional views of the display shown in FIG. 4 (a), cut along the line A-A' and line B-B', respectively.

FIG. 3 shows part of the cross-section of the substrate shown in FIG. 4 (a), cut along the line A-A'. It should be noted that the views shown in FIGS. 4 (b) and (c) outline the substantial part, and are not exactly corresponding to the sections cut along the line A-A' and line B-B' shown in FIG. 4 (a). For example, the semiconductor film 116 shown in FIG. 3 is omitted in FIG. 4 (b).

The liquid crystal display of the second embodiment of the present invention comprises the gate electrode 104 of chromium (Cr) and common electrode interconnection 120, both formed on the glass substrate 101 as the active matrix substrate, and gate insulation film 107 of silicon nitride, formed in such a way to cover the gate electrode 104 and common electrode interconnection 120.

Moreover, the semiconductor film 116 of amorphous silicon or polysilicon is provided on the gate electrode 104 via the gate insulation film 107, to work as the active layer (active element) for a thin-film transistor (TFT).

Still more, the drain electrode 106 of chromium/molybdenum (Cr/Mo) and source electrode (pixel electrode) 105 are provided in such a way to partly overlap the pattern on the semiconductor film 116. These electrodes are totally covered by the protective insulation film 108 of silicon nitride.

The organic protective film 112 is provided on the protective insulation film 108. The organic protective film 112 is composed of a transparent material, e.g., acrylic resin.

The pixel electrode 105 is composed of a transparent material, e.g., ITO ($In_2O_3$:Sn).

The common electrode 103 is connected to the common electrode interconnection 120 via the through-hole 118 running through the gate insulation film 107, protective insulation film 108 and organic protective film 112.

When an electrical field is produced to drive the liquid crystal molecules, the common electrode 103 and pixel electrode 105 pairing with each other are formed in such a way to enclose a pixel in the planar view.

Moreover, the common electrode 103 is provided on the organic protective film (overcoat layer) 112. The common electrode 103 is provided to cover the drain electrode 106, scanning signal interconnection 104 and thin-film transistor (TFT) below in the planar view, and works also as a light-shielding layer for the semiconductor film 116.

The alignment layer 109 is provided on the glass substrate 101 as the active matrix substrate on which the unit pixels are arranged in a lattice pattern, i.e., on the organic protective film 112 and common electrode 103 formed on the organic protective film 112.

On the glass substrate 102 as the opposite substrate, on the other hand, the color filter 111, organic protective film 112 and alignment layer 109 are formed, in this order.

The alignment layer 109 is provided with a liquid crystal alignment capacity, when irradiated with ultraviolet ray emitted from a high-voltage mercury lamp as the light source and linearly polarized by a laminate of quartz plates as a pile polarizer, as in the first embodiment.

The glass substrate 101 and opposite substrate 102 are provided in such a way to face with each other on the plane on which the alignment layer 109 is formed. They hold in-between the liquid crystal composition layer 110' composed of the liquid crystal molecules 110. Moreover, the polarizer plate 114 is provided on the external surface of each of the glass substrates 101 and 102.

The pixel electrode 105 is provided below the organic protective film 112 and protective insulation film 108, and the common electrode 103 is provided on the pixel electrode 105 and organic protective film 112 in the second embodiment of the present invention as in the first embodiment.

Moreover, the common electrode 103 may work also as the undermost common electrode interconnection 120, when The common electrode 103 has a sufficiently low electrical resistance. This can dispense with the common electrode interconnection 120 and related through-holes.

In the second embodiment, one pixel is formed by the common electrodes 103 arranged in a lattice pattern, as illustrated in FIG. 4 (a), where these electrodes and pixel electrodes 105 divide each pixel into four areas.

Moreover, a zigzag bent structure is formed with the pixel electrode 105 and common electrode 103 facing the electrode 105 running in parallel to each other, where one pixel is composed of two or more sub-pixels, to cancel out in-plane tone changes with each other.

Figure 5:
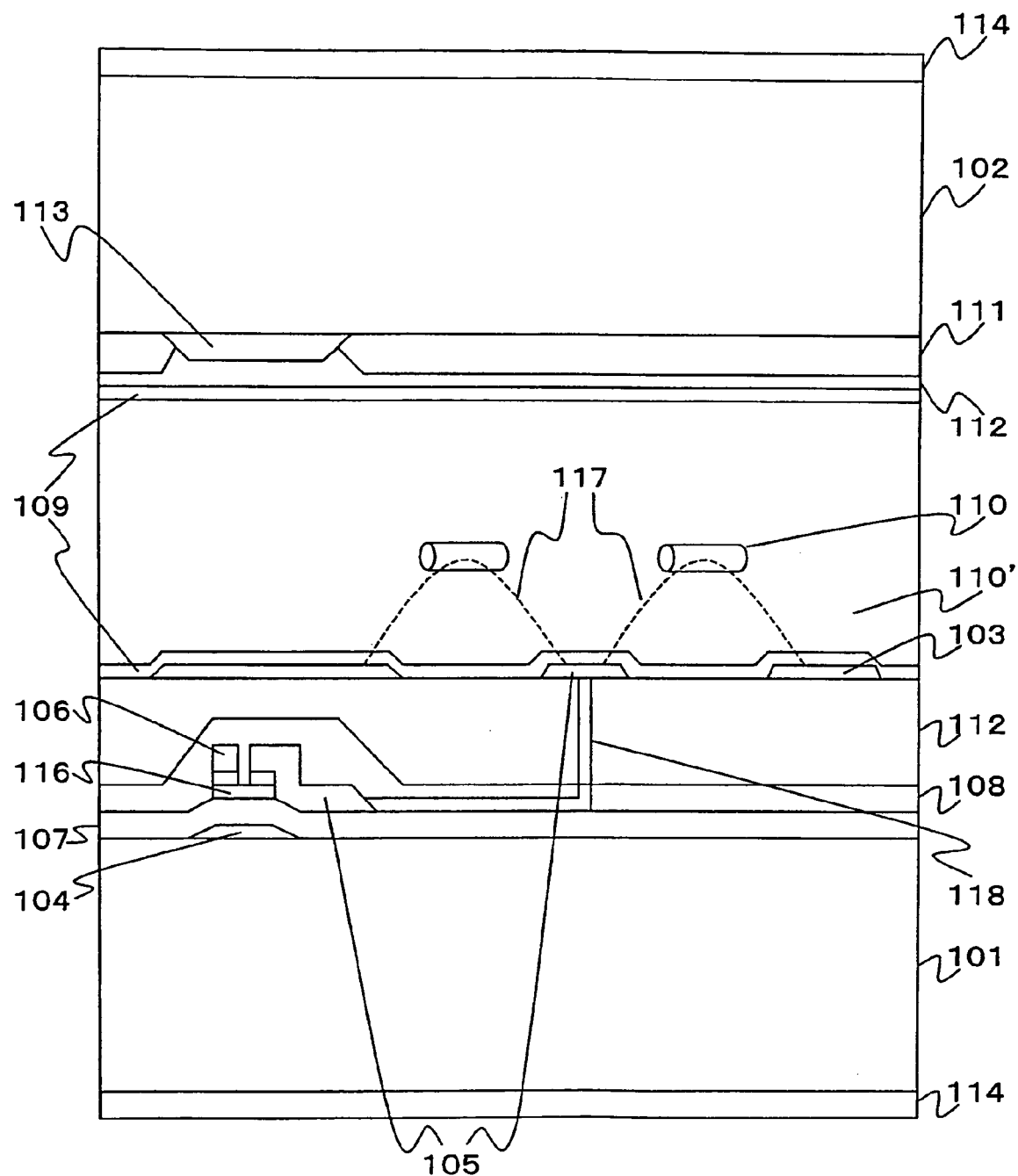
FIG. 5 is a cross-sectional view around the pixel for describing the pixel structure for the third embodiment of the liquid crystal display of the present invention.

FIG. 5 schematically illustrates a cross-section around a pixel for describing the third embodiment of the liquid crystal display of the present invention, where each component performs the same function as the one marked with the same numeral, described before.

As shown in FIG. 5, in the embodiment, the source electrode 105 provided at a layer under the protective insulation film 108 was drawn up over the organic protective layer 112 via through-hole 118 to arrange it at a layer of same level as the common electrode 103.

In the TFT liquid crystal display of the above structure, the liquid crystal molecules 110 which constitute the liquid crystal composition layer 110' are aligned in the direction essentially in parallel to the substrates 101 and 102 surfaces facing each other, when no electrical field is applied thereto, i.e., homogeneously aligned in the initial alignment direction as set by the photo-alignment treatment.

When a voltage is applied to the gate electrode 104 to switch the thin-film transistor (TFT) on, the electrical field 117 is applied to the liquid crystal composition layer 110' by the potential difference between the pixel electrode 105 and common electrode 103, and the liquid crystal molecules 110 which constitute the layer 110' change their alignment direction to align with the electrical field 117 by the interactions between refractive anisotropy of the layer 110' and the electrical field. This changes light transmittance of the display by the actions of refractive anisotropy of the layer 110' and the polarizer plate 114, to display images.

The display of each embodiment described above may have a plurality of display areas, each composed of the common and pixel electrodes for one pixel. This design can reduce distance between the pixel and common electrodes even when the pixel has a large area, and thereby reduce a voltage applied to drive the liquid crystal molecules.

The transparent, electroconductive material for the film working as least one of the pixel and common electrodes is not limited. However, an ion-doped titanium oxide (e.g., indium-tin-oxide, ITO) or zinc oxide is preferable in consideration of fabricability easiness and high reliability, among others.

An IPS display generally requires no tilting in the interface with the substrate for its working principle, unlike a display of vertical electrical field, represented by a TN display. It is known that vision-related characteristics improve as interfacial tilting angle decreases. A smaller interfacial tilting angle is more preferable also for a photo-reactive alignment layer, particularly effective when it is 1° or less.

Next, production of the alignment layer by rubbingless treatment for the liquid crystal display of the present invention is described. The process flow for production of the alignment layer for the present invention comprises the following steps (1) to (4):

(1) Coating/production of the alignment layer (Uniform coating of the entire display area)

(2) Calcination of the alignment layer for imidization (Removal of varnish solvent and acceleration of imidization for higher heat resistance)

(3) Irradiation of the alignment layer with polarized light for providing a liquid crystal alignment capacity (Providing the capacity uniformly over the display area)

(4) Acceleration/stabilization of alignment (with heating, or infrared, far-infrared, electron or radioactive ray)

The alignment layer is produced in the four stages, where the order of the above steps (1)-(4) is not limited to the above. For example, it is expected that the processes (I) and (II), described below, can bring more favorable effects.

(I) Temporarily overlapping the above steps (3) and (4) can accelerate evolution of the liquid crystal alignment capacity and induce cross-linking or the like, to produce the alignment layer more efficiently.

(II) Temporarily overlapping the above steps (2), (3) and (4) allows the step (4) to work also as the imidization step (2) to produce the alignment layer in a shorter time, when it is aided by heating, or infrared ray, far-infrared ray or the like.

Next, the process for producing the liquid crystal display of the present invention is described more specifically by EXAMPLES.

Example 1

EXAMPLE 1 corresponds to the first embodiment of the present invention, described above. It is described in detail by referring to FIGS. 1 and 2.

For production of the liquid crystal display of the first embodiment of the present invention, a glass substrate surface-polished to a thickness of 0.7 mm is used for the substrate 101 as the active matrix substrate and substrate 102 as the opposite substrate (color filter substrate).

The thin-film transistor to be formed on the glass substrate 101 is composed of the source electrode (pixel electrode) 105, drain electrode (signal electrode) 106, gate electrode (scanning electrode) 104 and semiconductor film (of amorphous silicon) 116.

All of the scanning electrode 104, common electrode interconnection 120, signal electrode 106 and pixel electrode 105 are produced by patterning a chromium film, where the pixel electrode 105 and common electrode 103 are set 7 μm apart from each other.

A chromium film, which is low in resistance and can be easily patterned, is used for the common electrode 103 and pixel electrode 105. However, it may be replaced by an ITO film for the transparent electrode to achieve higher brightness characteristics.

The gate insulation film 107 and protective insulation film 108 are made of silicon nitride, each being 0.3 μm thick. The film 108 is coated with an acrylic resin, and heated at 220° C. for 1 hour to form the organic protective film 112, which is transparent and insulating.

Next, the through-hole is formed by photolithography and etching to run up to the common electrode interconnection 120, as illustrated in FIG. 2 (c), and the common electrode 103 to be connected to the common electrode interconnection 120 is formed thereon by patterning.

The resulting unit pixel has a structure with the pixel electrode 105 arranged between the three common electrodes 103. Therefore, the active matrix substrate carries a total of 1024×3×768 pixels formed by 1024×3 signal electrodes (for red, green and blue colors) and 768 scanning electrodes 104.

A liquid crystal alignment layer is provided on the active matrix substrate by printing a polyamic acid varnish composed of 1,4-diaminopyridine (represented by the general formula [Compound 23]) and 1-methyl-1,2,3,4-cyclobutane-tetracarboxylic dianhydride (represented by the general formula [Compound 24]), adjusted to have a composition of resin (5%), NMP (60%) γ-butyllactone (20%) and butyl cellosolve (15%), all percentages by mass, and heated at 220° C. for 30 minutes for imidization. The resulting alignment layer 109 of polyimide is dense and about 70 nm thick.

Compound 23

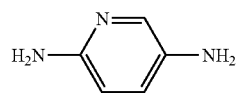

Compound 24

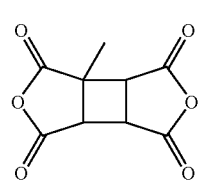

The other ITO-coated glass substrate 102 is coated with a polyamic acid varnish in a similar manner by printing, and heated at 220° C. for 30 minutes to produce the dense, about 70 nm thick alignment layer 109 of polyimide.

The alignment layer 109 of polyimide is irradiated with polarized ultraviolet ray (UV) at an irradiation energy of about 5 J/cm$^2$ to have a liquid crystal alignment capacity on the surface, where light emitted from a high-voltage mercury lamp as the light source is filtered by an interference filter to have ultraviolet ray (wavelength: 240 to 380 nm), which is then linearly polarized by a laminate of quartz plates as a pile polarizer to have a polarization ratio of about 10/1.

It is found that the liquid crystal molecules on the alignment layer surface are aligned at a right angle to the UV polarization direction.

Next, these two glass substrates 101 and 102 are set with a spacer of dispersed spherical polymer beads in-between in such a way that the alignment layer 109 sides each having its own liquid crystal alignment capacity face each other. Then, the peripheral portions are sealed with a sealant, to produce a liquid crystal display panel (sometimes referred to as cell) as the liquid crystal display. The liquid crystal molecules on these two glass plates are aligned on a parallel with each other, and are slanted at 75° to the electrical field direction.

Then, a nematic liquid crystal composition A is injected into the liquid crystal display panel, and sealed with a UV-curable resin as a sealant, to produce the liquid crystal panel, which includes the liquid crystal layer having a thickness (gap) of 4.2 μm. The nematic liquid crystal composition A has a dielectric anisotropy $\Delta\in$ of positive 10.2 (1 KHz, 20° C.), refractive index anisotropy Δn of 0.075 (wavelength of 590 nm, 20° C.), torsional elastic coefficient K2 of 7.0 pN and nematic-isotropic phase transition temperature (N-1) of about 76° C.

The liquid crystal display panel has a retardation (Δnd) of about 0.31 μm. A homogeneously aligned liquid crystal display panel is produced using the alignment layer and liquid crystal composition equivalent to those for the above panel, and measured for pre-tilt angle of the liquid crystal molecules by crystal rotation. It is about 0.2°.

The liquid crystal display panel is placed between the two polarizer plates 114, where the polarized light transmission axis in one polarizer plate is set essentially in parallel to the liquid crystal alignment direction and that in the other plate perpendicular to the alignment direction.

Then, a drive circuit, back light and others are connected to the above assembly to produce an active matrix type liquid crystal display module. It has normally closed characteristics, displaying dark images at a low voltage and bright images at a high voltage.

The liquid crystal display of EXAMPLE 1 of the present invention is evaluated for quality of the images it produces. The images are confirmed to be of high quality, having a contrast ratio of 600/1. A wide viewing angle is also confirmed during the gradation display period.

The image sticking/afterimage characteristics of the above display are quantitatively analyzed by a photodiode-equipped oscilloscope.

First, a window pattern is displayed at the maximum brightness for 30 minutes, and then this mode is switched to a gradation display mode at a brightness of 10% of the maximum. It is known that an after image is most notably observed during the gradation display period. These characteristics are evaluated by defining a time span in which the window pattern edges are dissolved is defined as afterimage relaxation time, where the allowable relaxation time is set at 5 minutes or less.

It is found that the afterimage relaxation time is 1 minute or less over a service temperature range (0 to 50° C.). The visual image quality/afterimage test also confirms high display characteristics, because uneven images resulting from image sticking/afterimages are not observed at all.

The conventional photo-alignment treatment, although giving alignment to liquid crystal molecules, is believed to have a lower anchoring energy, i.e., energy for anchoring aligned liquid crystal molecules to the aligned layer surface, than the common rubbing alignment treatment.

A liquid crystal display of low anchoring energy is believed to lack product reliability. In particular, it is believed that anchoring energy is more important in the azimuthal angle direction than in the polar angle direction in a homogeneously aligned system.

Therefore, a film of the same material as that for the above display is formed on a glass substrate and alignment-treated also in the same manner, and the same liquid crystal composition is sealed in the display to prepare a liquid crystal cell. It is measured for intensity of the twisted bond in the interface between the liquid crystal molecules and aligned layer surface, or anchoring energy A2 in the azimuthal angle direction by the torque balance method (Hasegawa, et. al, Japanese Liquid Crystal Society Symposium Preceedings 3B12 (2001), page 251). The energy A2 is $7.0 \times 10^{-4}$ N/m. This compares with $8.6 \times 10^{-5}$ N/m of the display produced in COMPARATIVE EXAMPLE 1.

Example 2

A liquid crystal display is produced in the same manner as in EXAMPLE 1, except that a liquid crystal alignment layer is provided on the substrate by printing a polyamic acid varnish composed of tetracarboxylic dianhydride (represented by the general formula [Compound 25]) as an acid dianhydride and 3,4-diaminothiophene (represented by the general formula [Compound 26]) as a diamine compound, and heated at 220° C. for 30 minutes for imidization to have an about 40 nm thick film. It is then treated for photo-alignment with polarized ultraviolet ray of KrF excimer laser beams (wavelength: 248 nm) and nitrogen laser beams (wavelength: 337 nm).

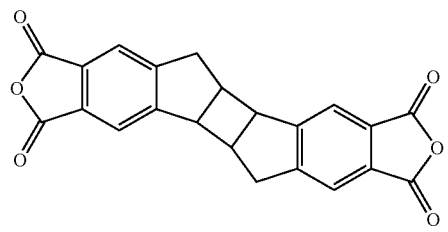

Compound 25

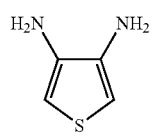

Compound 26

The nematic liquid crystal composition A is sealed in the display as in EXAMPLE 1, and annealed at 100° C. for 10 minutes. The liquid crystal molecules are well-aligned, essentially at a right angle to the polarized light irradiation direction.

The liquid crystal display panel has the liquid crystal layer having a thickness d of 4.0 μm. A homogeneously aligned liquid crystal display panel is produced using the alignment layer and liquid crystal composition equivalent to those for the above panel, and measured for pre-tilt angle of the liquid crystal molecules by crystal rotation. It is about 0.5°.

The liquid crystal display is evaluated for quality of the images it produces in a manner similar to that for EXAMPLE 1. The images are confirmed to be of high quality, having a contrast ratio of above 500/1, almost on a level with that of the display produced in EXAMPLE 1, over the entire display area. A wide viewing angle is also confirmed during the gradation display period.

The display is quantitatively evaluated for the image sticking/afterimage relaxation time in a manner similar to that for EXAMPLE 1. It is found that the afterimage relaxation time is about 1 minute over a service temperature range (0 to 50° C.). The visual image quality/afterimage test also confirms high display characteristics as in EXAMPLE 1, because uneven images resulting from image sticking/afterimages are not observed at all.

Comparative Example 1

A liquid crystal display is produced in the same manner as in EXAMPLE 1, except that a liquid crystal alignment layer is provided on the substrate by printing a polyamic acid varnish composed of pyromellitic acid dianhydride (represented by the general formula [Compound 27]) as an acid dianhydride and m-phenylenediamine (represented by the general formula [Compound 28]) as a diamine compound, to demonstrate the effects of the present invention.

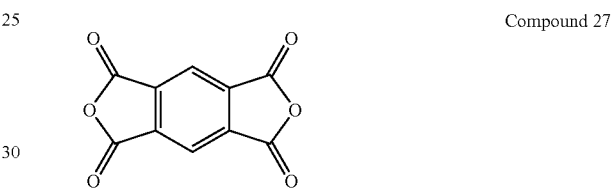

Compound 27

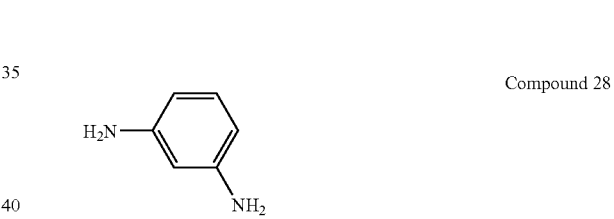

Compound 28

The liquid crystal display is evaluated for quality of the images it produces in a manner similar to that for EXAMPLE 1. The display is confirmed to be inferior to the present invention produced in EXAMPLE 1 in contrast ratio, which is below 100/1 over the entire display area, although showing a similarly wide viewing angle.

The display is quantitatively evaluated for the image sticking/afterimage relaxation time in a manner similar to that for EXAMPLE 1. It is found that the image sticking/afterimage relaxation time is about 20 minutes over a service temperature range (0 to 50° C.). The visual image quality/afterimage test also confirms that the display needs a longer afterimage relaxation time and fails to exhibit high display characteristics of the display produced in EXAMPLE 1. It has an anchoring energy A2 of about $8.6 \times 10^{-4}$ N/m in the azimuthal angle direction.

Example 3

A liquid crystal display is produced in the same manner as in EXAMPLE 1, except that a liquid crystal alignment layer is provided on the substrate by printing a polyamic acid varnish composed of 1,3-dimethyl-1,2,3,4-cyclobutanetetracarboxylic dianhydride (represented by the general formula [Compound 29]) and pyromellitic acid dianhydride (represented by the general formula [Compound 30]) as acid dianhydrides (molar ratio: 7/3) and p-phenylenediamine (represented by the general formula [Compound 31]) as a diamine compound to a thickness of about 50 nm.

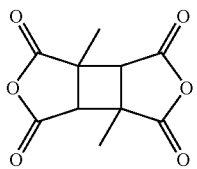

Compound 29

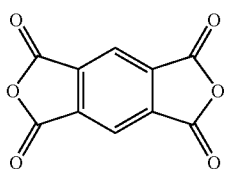

Compound 30

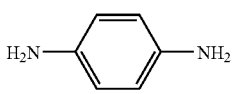

Compound 31

The liquid crystal display is evaluated for quality of the images it produces in a manner similar to that for EXAMPLE 1. The images are confirmed to be of high quality, having a contrast ratio of above 550/1, almost on a level with that of the display produced in EXAMPLE 1, over the entire display area. A wide viewing angle is also confirmed during the gradation display period.

The display is quantitatively evaluated for the image sticking/afterimage relaxation time in a manner similar to that for EXAMPLE 1. It is found that the afterimage relaxation time is about 1 minute over a service temperature range (0 to 50° C.). The visual image quality/afterimage test also confirms high display characteristics as in EXAMPLE 1, because uneven images resulting from image sticking/afterimages are not observed at all.

Two types of polyamic acid varnishes are prepared, comprising the above two acid anhydrides, 1,3-dimethyl-1,2,3,4-cyclobutanetetracarboxylic dianhydride and pyromellitic acid dianhydride, are prepared for the alignment layer, where these anhydrides are in a ratio of 1/1 in one type and 3/7 in the other. Then, two types of liquid crystal display panels are produced using these varnishes. They have a contrast ratio of about 450/1 and 180/1, respectively.

Moreover, they have an afterimage relaxation time of about 3 and 8 minutes, respectively. Therefore, the 3/7 composition of 1,3-dimethyl-1,2,3,4-cyclobutanetetracarboxylic dianhydride and pyromellitic acid dianhydride greatly deteriorates the display characteristics.

Example 4

Next, the specific liquid crystal display structure produced in EXAMPLE 4, which corresponds to the second embodiment of the present invention, is described by referring to FIGS. 3 and 4. For production of the liquid crystal display of EXAMPLE 4, a glass substrate surface-polished to a thickness of 0.7 mm is used for the substrates 101 and 102.

The thin-film transistor is composed of the source electrode (pixel electrode) 105, drain electrode (signal electrode) 106, gate electrode (scanning electrode) 104 and semiconductor film (of amorphous silicon) 116. The scanning electrode 104 is made of an aluminum film, common electrode interconnection 120 and signal electrode 106 are made of a chromium film, and pixel electrode 105 is made of an ITO film, all patterned. All of these, except the scanning electrode 104, have an electrode interconnection pattern zigzag bent at 10°, as illustrated in FIG. 4 (a). The gate insulation film 107 and protective insulation film 108 are made of silicon nitride, each being 0.3 μm thick.

Next, the cylindrical through-hole 118, about 10 μm in diameter, is formed by photolithography and etching to run up to the common electrode interconnection 120, as illustrated in FIG. 4 (c). It is coated with an acrylic resin, which is heated at 220° C. for 1 hour to form the interlayer insulation film 112, transparent, insulating, and having a dielectric constant of about 4 and thickness of about 1 μm. This insulation film 112 flattens the step-caused irregularities on the pixel electrode 105 in the display area, and those in the interface with the color filter layer 111 between the adjacent pixels.

Then, the through-hole 118 (about 7 μm in diameter) is etched again, and the common electrode 103 to be connected to the common electrode interconnection 120 is formed thereon by patterning an ITO film, where the pixel electrode 105 and common electrode 103 are set 7 μm apart from each other. Moreover, the common electrodes 103 are arranged in a lattice pattern in such a way to cover the upper sides of the image signal interconnections 106, scanning signal interconnections 104 and thin-film transistors while enclosing each pixel, to work also as a light-shielding layer.

The resulting unit pixel has a structure with the pixel electrode 105 arranged between the 3 common electrodes 103. Therefore, the active matrix substrate carries a total of 1024× 3×768 pixels formed by 1024×3 signal electrodes (for red, green and blue colors) and 768 scanning electrodes 104.

The alignment layer 109 is provided by printing a polyamic acid varnish composed of 1,2,3,4-tetramethyl-1,2,3,4-cyclobutanetetracarboxylic dianhydride (represented by the general formula [Compound 32]) and p-phenylenediamine (represented by the general formula [Compound 33]) to a thickness of about 60 nm. It is treated for photo-alignment with polarized UV at an irradiation energy of about 3 J/cm² in the same manner as in EXAMPLE 1, except that the substrate on which the film is provided is heated at about 150° C. during the UV treatment.

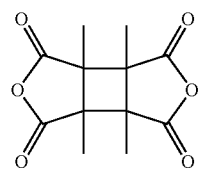

Compound 32

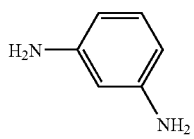

Compound 33

Next, these two glass substrates are set with a spacer of dispersed spherical polymer beads in-between in such a way that the alignment layer 109 sides face each other. Then, the peripheral portions are sealed with a sealant, to produce the liquid crystal display. The liquid crystal molecules on these two glass plates are aligned essentially on a parallel with each other, and are slanted at 75° to the electrical field direction.

Then, a nematic liquid crystal composition A is injected into the liquid crystal display panel, and sealed with a UV-curable resin as a sealant, to produce the liquid crystal panel, which includes the liquid crystal layer having a thickness (gap) of 4.2 μm. The nematic liquid crystal composition A has a dielectric anisotropy $\Delta\in$ of positive 10.2 (1 KHz, 20° C.), refractive index anisotropy $\Delta n$ of 0.075 (wavelength of 590 nm, 20° C.), torsional elastic coefficient K2 of 7.0 pN and nematic-isotropic phase transition temperature (N-1) of about 76° C. The panel has a retardation ($\Delta nd$) of about 0.31 μm.

A homogeneously aligned liquid crystal display panel is produced using the alignment layer and liquid crystal composition equivalent to those for the above panel, and measured for pre-tilt angle of the liquid crystal molecules by crystal rotation. It is about 0.2°.

The panel is placed between the two polarizer plates 114, where the polarized light transmission axis in one polarizer plate is set essentially in parallel to the liquid crystal alignment direction and that in the other plate perpendicular to the alignment direction. Then, a drive circuit, back light and others are connected to the above assembly to produce an active matrix type liquid crystal display module. It has normally closed characteristics, displaying dark images at a low voltage and bright images at a high voltage.

The liquid crystal display of EXAMPLE 4 of the present invention is evaluated for quality of the images it produces. It is confirmed to have a higher aperture ratio than the display of EXAMPLE 1, produce high-quality images having a contrast ratio of 600/1, and have a wide viewing angle during the gradation display period.

The display is quantitatively evaluated for the image sticking/afterimage relaxation time in a manner similar to that for EXAMPLE 1. It is found that the afterimage relaxation time is about 1 minute over a service temperature range (0 to 50° C.). The visual image quality/afterimage test also confirms high display characteristics as in EXAMPLE 1, because uneven images resulting from image sticking/afterimages are not observed at all.

A liquid crystal alignment layer is provided on a glass substrate in the same manner as in EXAMPLE 4, and the sample is scraped away to determine its glass transition temperature by differential scanning calorimetry (DSC). A clear glass transition temperature is not observed in a temperature range of 50 to 300° C., from which it is judged that the alignment layer of EXAMPLE 4 is above 300° C., which is an upper measurable temperature limit.

Example 5

A liquid crystal display panel is produced in the same manner as in EXAMPLE 1, except that a liquid crystal alignment layer is provided on the substrate by printing a polyamic acid varnish composed of 1,2,3,4-cyclobutanetetracarboxylic dianhydride (represented by the general formula [Compound 34]) and 2,7-diaminocarbazole (represented by the general formula [Compound 35]) to a thickness of about 100 nm. The resulting film is treated for photo-alignment in the same manner as in EXAMPLE 4, except that it is irradiated with polarized UV ray at an irradiation energy of about 5 J/cm², where light emitted from a high-voltage mercury lamp is filtered by an interference filter to have ultraviolet ray (wavelength: 240 to 380 nm, which is then linearly polarized by a pile polarizer of quartz to have a polarization ratio of about 10/1.

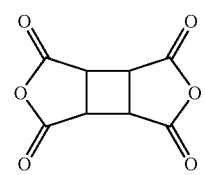

Compound 34

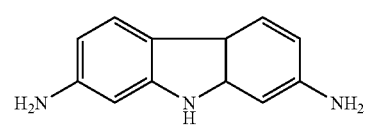

Compound 35

The liquid crystal display panel is evaluated for quality of the images it produces. The images are confirmed to be of high quality, almost on a level with those produced by the display of EXAMPLE 4. A wide viewing angle is also confirmed during the gradation display period.

The display of EXAMPLE 5 is quantitatively evaluated for the image sticking/afterimage relaxation time in a manner similar to that for EXAMPLE 1. It is found that the afterimage relaxation time is 1 minute or less over a service temperature range (0 to 45° C.). The visual image quality/afterimage test also confirms high display characteristics, because uneven images resulting from image sticking/afterimages are not observed at all.

A liquid crystal alignment layer is provided on a glass substrate in the same manner as in EXAMPLE 4, and the sample is scraped away to determine its glass transition temperature by differential scanning calorimetry (DSC). A clear glass transition temperature is not observed in a temperature range of 50 to 300° C., from which it is judged that the alignment layer of EXAMPLE 5 is above 300° C., which is an upper measurable temperature limit.

A liquid crystal display is produced in the same manner as in EXAMPLE 5, except that 1,3-dimethyl-1,2,3,4-cyclobutanetetracarboxylic dianhydride is used as an acid dianhydride and the photo-alignment treatment is carried out at an irradiation energy of about 3 J/cm². The display is found to have the display characteristics on a level with those of the display produced in EXAMPLE 5.

A liquid crystal display is produced in the same manner as in EXAMPLE 5, except that 1,2,3,4-tetramethyl-1,2,3,4-cyclobutanetetracarboxylic dianhydride is used as an acid dianhydride and the photo-alignment treatment is carried out at an irradiation energy of about 2 J/cm². The display is found to have the display characteristics on a level with those of the display produced in EXAMPLE 5.

Example 6

A liquid crystal display is produced in the same manner as in EXAMPLE 5, except that the spacer of polymer beads used for cell gap control is replaced by a pattern of columns each having a diameter of about 10 μm, which is provided on the active matrix substrate by spreading a negative photo-sensitive acrylic resin thereon, and exposing and developing the resulting film before the alignment layer is provided on the substrate, the pattern being on the common electrode 103 working as the light-shielding layer on the scanning interconnection 104 in the vicinity of the TFT in each pixel; and then a liquid crystal alignment layer is provided on the substrate by printing a polyamic acid varnish composed of 1-amino-2-(4'-aminophenyl)-ethene (represented by the general formula [Compound 36]) and 3,6-diaminoindacene (represented by the general formula [Compound 37]) as diamines (molar ratio: 1/2) and 1,3-dichloro-1,2,3,4-cyclobutanetetracarboxylic dianhydride (represented by the general formula [Compound 38]) as an acid dianhydride to a thickness of about 40 nm.

Compound 36

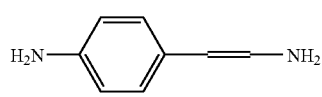

Compound 37

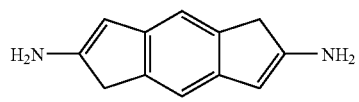

Compound 38

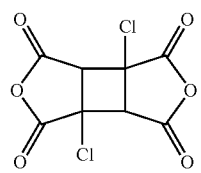

It is treated for photo-alignment in the same manner as in EXAMPLE 5 with polarized UV ray at an irradiation energy of about 3 J/cm², where light emitted from a high-voltage mercury lamp is filtered by an interference filter to have ultraviolet ray (wavelength: 240 to 310 nm), which is then linearly polarized by a pile polarizer of quartz to have a polarization ratio of about 10/1. At the same time, it is irradiated with soft X ray, generated by a soft X-ray generator, from a short distance.

The liquid crystal display of EXAMPLE 6 is evaluated for quality of the images it produces. It is confirmed to produce images of higher contrast ratio than that of EXAMPLE 5.

A wide viewing angle is also confirmed during the gradation display period, conceivably resulting from complete removal of light leakage, observed in EXAMPLE 5, caused by distorted alignment of the liquid crystal molecules around spacer beads randomly distributed in pixels.

The display of EXAMPLE 6 is quantitatively evaluated for the image sticking/afterimage relaxation time in a manner similar to that for EXAMPLE 1. It is found that the afterimage relaxation time is 1 minute or less as in EXAMPLE 5. The visual image quality/afterimage test also confirms high display characteristics, because uneven images resulting from image sticking/afterimages are not observed at all.

Example 7

A liquid crystal display is produced in the same manner as in EXAMPLE 4, except that a liquid crystal alignment layer is provided on a substrate by printing a polyamic acid varnish composed of 2,7-diaminodibenzothiophene (represented by the general formula [Compound 39]) as a diamine compound and 1,2,3-trimethyl-1,2,3,4-cyclobutanetetracarboxylic dianhydride (represented by the general formula [Compound 40]) as an acid dianhydride, and heated at 230° C. for 30 minutes for imidization. The alignment layer is about 30 nm thick.

Compound 39

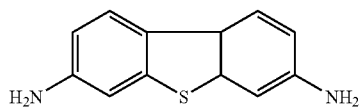

Compound 40

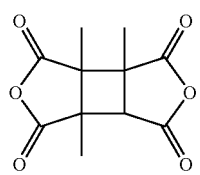

The alignment layer is then treated for photo-alignment with polarized ultraviolet ray of nitrogen laser beams (wavelength: 337 nm) at an irradiation energy of about 4 J/cm² while being irradiated with far-infrared ray to be kept at about 200° C. during the treatment.

The nematic liquid crystal composition A is sealed in the display as in EXAMPLE 4, and annealed at 100° C. for 10 minutes. The liquid crystal molecules are well-aligned, essentially at a right angle to the polarized light irradiation direction.

The liquid crystal display has the liquid crystal layer having a thickness d of 4.0 μm. A homogeneously aligned cell is produced using the alignment layer and liquid crystal composition equivalent to those for the above panel, and measured for pre-tilt angle of the liquid crystal molecules by crystal rotation. It is about 0.3°.

The liquid crystal display of EXAMPLE 7 is evaluated for quality of the images it produces in a manner similar to that for EXAMPLE 1. The images are confirmed to be of high quality, having a contrast ratio of above 600/1, almost on a level with that of the display produced in EXAMPLE 1, over the entire display area. A wide viewing angle is also confirmed during the gradation display period.

The display of EXAMPLE 7 is quantitatively evaluated for the image sticking/afterimage relaxation time in a manner similar to that for EXAMPLE 1. It is found that the afterimage relaxation time is 1 minute or less. The visual image quality/afterimage test also confirms high display characteristics, because uneven images resulting from image sticking/afterimages are not observed at all.

Example 8

A liquid crystal display is produced in the same manner as in EXAMPLE 4, except that a liquid crystal alignment layer is provided on a substrate by printing a polyamic acid varnish composed of 2,7-diaminophenazine (represented by the general formula [Compound 41]) as a diamine compound and 1-methyl-1,2,3,4-cyclobutanetetracarboxylic dianhydride (represented by the general formula [Compound 42]) as an acid dianhydride, and heated at 230° C. for 30 minutes for imidization. The alignment layer is about 20 nm thick.

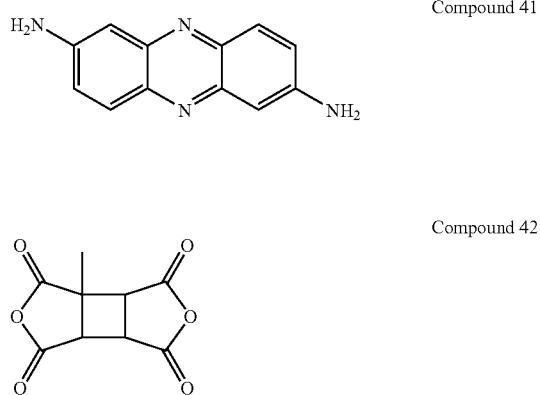

Compound 41

Compound 42

The alignment layer is then treated for photo-alignment with polarized ultraviolet ray of nitrogen laser beams (wavelength: 337 nm) at an irradiation energy of about 4 J/cm$^2$ while being irradiated with far-infrared ray to be kept at about 200° C. during the treatment. Then, the nematic liquid crystal composition A is sealed in the display as in EXAMPLE 4, and annealed at 100° C. for 10 minutes. The liquid crystal molecules are well-aligned, essentially at a right angle to the polarized light irradiation direction.

The liquid crystal display has the liquid crystal layer having a thickness d of 4.0 μm. A homogeneously aligned cell is produced using the alignment layer and liquid crystal composition equivalent to those for the above panel, and measured for pre-tilt angle of the liquid crystal molecules by crystal rotation. It is about 0.3°.

The liquid crystal display of EXAMPLE 8 is evaluated for quality of the images it produces in a manner similar to that for EXAMPLE 1. The images are confirmed to be of high quality, having a contrast ratio of above 600/1, almost on a level with that of the display produced in EXAMPLE 4, over the entire display area. A wide viewing angle is also confirmed during the gradation display period.

The display of EXAMPLE 8 is quantitatively evaluated for the image sticking/afterimage relaxation time in a manner similar to that for EXAMPLE 1. It is found that the afterimage relaxation time is 2 minutes or less. The visual image quality/afterimage test also confirms high display characteristics, because uneven images resulting from image sticking/afterimages are not observed at all.

The alignment layer for EXAMPLE 8 may be produced by a method other than the photo-alignment treatment by the aid of a combination of far-infrared ray and polarized UV of nitrogen laser beams. For example, it is found that the high display characteristics described above can be realized, when the film is irradiated, at an irradiation energy of about 3 J/cm$^2$, with UV emitted from a high-voltage mercury lamp and passed through an interference filter and pile polarizer of quartz to have a wavelength of 300 to 380 nm.

It is also found that the similarly high display characteristics can be realized, when the film is irradiated with carbon dioxide gas laser beams (wavelength: 10.5 μm) at 200 mJ and the polarized UV (wavelength: 300 to 380 nm) described above.

Example 9

Next, the liquid crystal display structure produced in EXAMPLE 9 is described by referring to FIG. 5. For production of the liquid crystal display, a glass substrate surface-polished to a thickness of 0.7 mm is used for the substrates 101 and 102.

The thin-film transistor is composed of the source electrode (pixel electrode) 105, drain electrode (signal electrode) 106, gate electrode (scanning electrode) 104 and semiconductor film (of amorphous silicon) 116. The scanning electrode 104 is made of an aluminum film, and common electrode interconnection 120, signal electrode 106 and pixel electrode 105 are made of a chromium film, all patterned.

The gate insulation film 107 and protective insulation film 108 are made of silicon nitride, each being 0.3 μm thick. The film 108 is coated with an acrylic resin, which is heated at 220° C. for 1 hour to form organic protective layer 112, transparent, insulating, and having a dielectric constant of about 4 and thickness of about 1.0 μm. This film 112 flattens the step-caused irregularities on the pixel electrode 105 in the display area, and those in the interface between the adjacent pixels.

Next, the cylindrical through-hole 118, about 10 μm in diameter, is formed by photolithography and etching to run up to the pixel electrode 105, as illustrated in FIG. 5, and the pixel electrode 105 to be connected to the source electrode 105 is formed thereon by patterning an ITO film.

The cylindrical through-hole 118, about 10 μm in diameter, is also formed for the common electrode interconnection 120, and the common electrode 103 is formed thereon by patterning an ITO film, where the pixel electrode 105 and common electrode 103 are set 7 μm apart from each other, and all of these, except the scanning electrode 104, have an electrode interconnection pattern zigzag bent at 10°.

Moreover, the common electrodes 103 are arranged in a lattice pattern in such a way to cover the upper sides of the image signal interconnections 106, scanning signal interconnections 104 and thin-film transistors while enclosing each pixel, to work also as a light-shielding layer.

The resulting unit pixel has essentially the same structure as that produced in EXAMPLE 4, except that it has the pixel electrode 105 arranged between the 3 common electrodes 103. Therefore, the active matrix substrate carries a total of 1024×3×768 pixels formed by 1024×3 signal electrodes (for red, green and blue colors) and 768 scanning electrodes 104.

A liquid crystal display is produced in the same manner as in EXAMPLE 4, except for pixel structure and alignment layer, as illustrated in FIG. 5.

The alignment layer is provided to a thickness of about 30 nm by printing a polyamic acid varnish synthesized to be composed of 1,4-diamino-2-vinyl benzene (represented by the general formula [Compound 43]) and 4,4'-diaminodiphenylamine (represented by the general formula [Compound 44]) as diamines (molar ratio: 2/1) and 1,2,3,4-cyclobutanetetracarboxylic dianhydride (represented by the general formula [Compound 45]) and 1-amino-1,2,3,4-cyclobutanetetracarboxylic dianhydride (represented by the general formula [Compound 46]) as acid dianhydrides (molar ratio: 1/2).

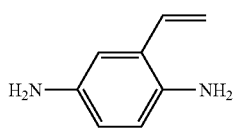

Compound 43

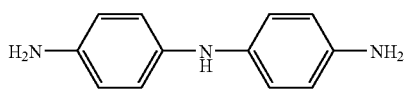

Compound 44

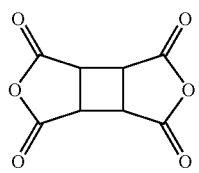

Compound 45

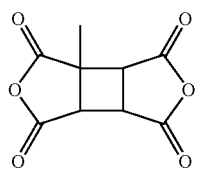

Compound 46

The thin-film transistor is composed of the source electrode (pixel electrode) 105, drain electrode (signal electrode) 106, gate electrode (scanning electrode) 104 and semiconductor film (of amorphous silicon) 116. All of the scanning electrode 104, common electrode interconnection 120, signal electrode 106, pixel electrode 105 and common electrode 103 are made of a patterned chromium film. The pixel electrode 105 and common electrode 103 are set 7 μm apart from each other.

The gate insulation film 107 and protective insulation film 108 are made of silicon nitride, each being 0.3 μm thick. A liquid crystal alignment layer is provided on the film 108 by printing a polyamic acid varnish composed of 2,5-diaminopyrrole (represented by the general formula [Compound 47]) as a diamine compound and 1,2,3,4-cyclobutanetetracarboxylic dianhydride (represented by the general formula [Compound 48]) as an acid dianhydride, and heated at 230° C. for 30 minutes for imidization. The resulting alignment layer is about 50 nm thick.

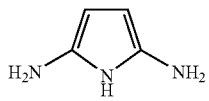

Compound 47

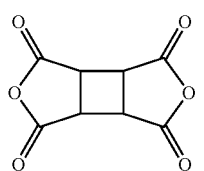

Compound 48

The alignment layer is then treated for photo-alignment with polarized UV ray (wavelength: 220 to 380 nm), at an irradiation energy of about 3 J/cm$^2$, emitted from a high-voltage mercury lamp, filtered by an interference filter and polarized by a pile polarizer of quartz while being irradiated with electron beams (5 eV, about 0.5 μC/cm$^2$) under a vacuum.

The resulting active matrix substrate carries a total of 1024×3×768 pixels formed by 1024×3 signal electrodes (for red, green and blue colors) and 768 scanning electrodes 104.

Figure 6:
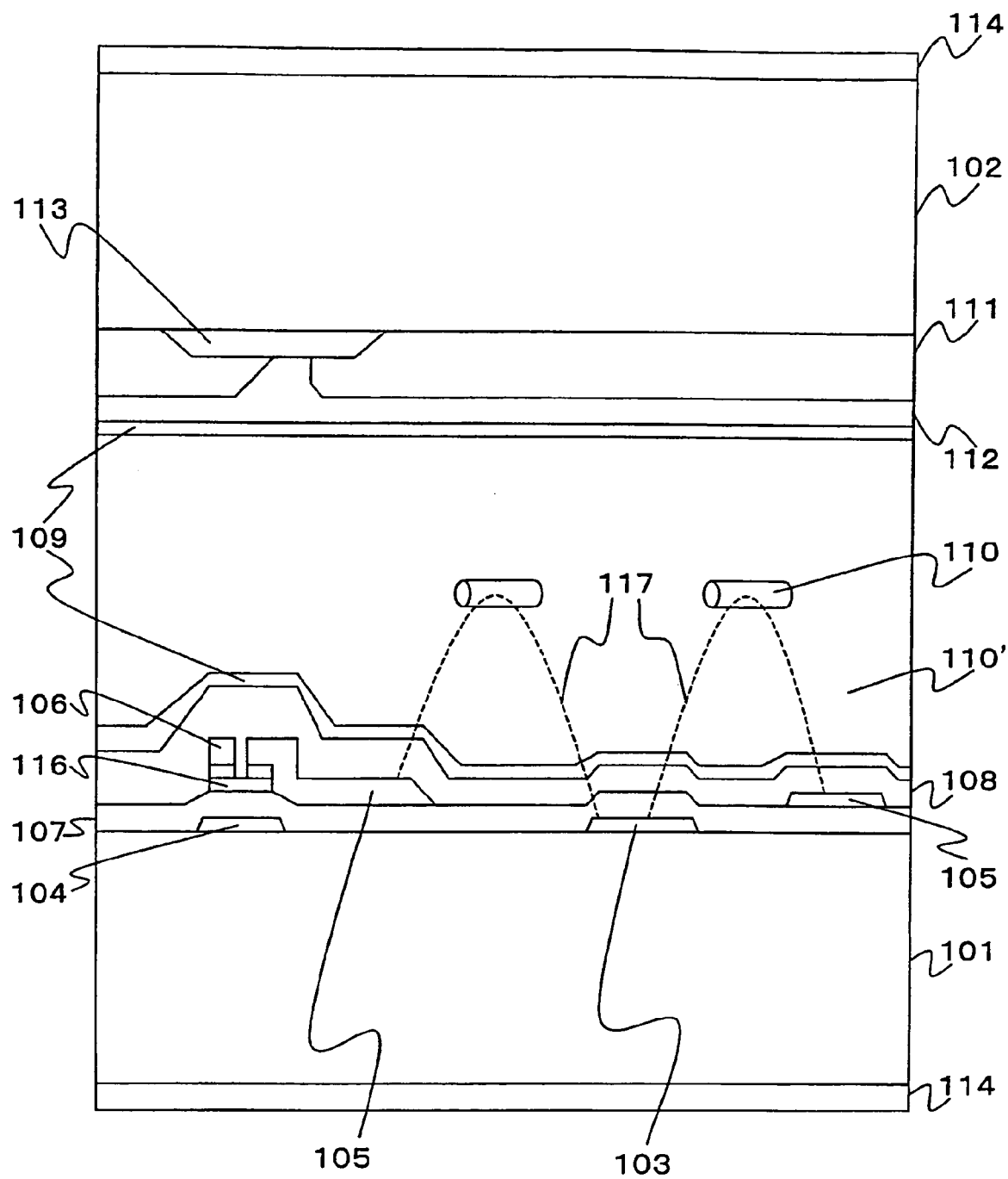
FIG. 6 is a cross-sectional view around the pixel for describing the pixel structure for the fourth embodiment of the liquid crystal display of the present invention.

The liquid display of EXAMPLE 10 is thus produced, as illustrated in FIG. 6, in the same manner as in EXAMPLE 1 except for pixel structure.

The liquid crystal display is evaluated for quality of the images it produces. The images are confirmed to be of high quality essentially on a level with those of the display of EXAMPLE 1, and a wide viewing angle is also confirmed during the gradation display period.

The display is quantitatively evaluated for the image sticking/afterimage relaxation time in a manner similar to that for EXAMPLE 1. It is found that the afterimage relaxation time is 2 minutes or less. The visual image quality/afterimage test finds no defective images resulting from image sticking/afterimages.

Moreover, a liquid crystal display is produced in the same manner as in EXAMPLE 10, except that the polyamic acid varnish is incorporated with 2,5-diamino-3-vinylpyrrole (represented by the general formula [Compound 49]), which is a derivative of the above diamine compound, at 50% by mol. It exhibits similarly high display characteristics, when The liquid crystal display is evaluated for quality of the images it produces. The images are confirmed to be of high quality almost on a level with those of the display of EXAMPLE 1, and a wide viewing angle is also confirmed during the gradation display period.

The display is quantitatively evaluated for the image sticking/afterimage relaxation time in a manner similar to that for EXAMPLE 1. It is found that the afterimage relaxation time is 1 minute or less. The visual image quality/afterimage test also confirms high display characteristics, because uneven images resulting from image sticking/afterimages are not observed at all.

Common alignment treatment by rubbing will cause friction-caused static buildup on a liquid crystal alignment layer, when it is sufficiently thin and formed on pixel electrodes, each provided on the uppermost substrate surface to be directly connected to a TFT as illustrated in FIG. 5. It may even damage the TFT element via the pixel electrode in the surface area in some cases. The rubbingless photo-alignment treatment carried out in each EXAMPLE is very effective in the above cases.

Example 10

FIG. 6 schematically illustrates a cross-section around a pixel for describing the fourth embodiment of the liquid crystal display of the present invention. For production of the liquid crystal display of EXAMPLE 10, a glass substrate surface-polished to a thickness of 0.7 mm is used for the substrates 101 and 102.

the alignment layer is irradiated with polarized UV ray at an irradiation energy of about 2 J/cm².

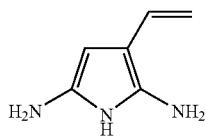

Compound 49

Example 11

A liquid crystal alignment layer is provided in the same manner as in EXAMPLE 10 except for composition, type and photo-alignment treatment method by printing a polyamic acid varnish composed of a thymine derivative (represented by the general formula [Compound 50]) as a diamine compound and 1,2,3,4-tetramethyl-1,2,3,4-cyclobutanetetracarboxylic dianhydride (represented by the general formula [Compound 51]) as an acid dianhydride, and heated at 90° C. for 2 minutes for leveling. The resulting alignment layer is about 35 nm thick.

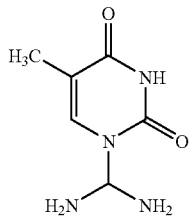

Compound 50

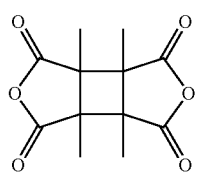

Compound 51

The alignment layer is then treated for photo-alignment with polarized UV ray, at an irradiation energy of about 5 J/cm², emitted from a high-voltage mercury lamp, filtered by an interference filter and polarized by a pile polarizer of quartz to have a wavelength of 220 to 380 nm, while being irradiated with far-infrared ray to be kept at about 230° C. during the treatment. The treated alignment layer is about 25 nm thick.

Then, the liquid crystal display of EXAMPLE 11 is produced in a manner similar to that for EXAMPLE 10. It is also illustrated in FIG. 6. Then, a nematic liquid crystal composition A is sealed in the display and annealed at 100° C. for 10 minutes. The liquid crystal molecules are well-aligned, essentially at a right angle to the polarized light irradiation direction. The liquid crystal display has the liquid crystal layer having a thickness d of 4.0 μm.

A homogeneously aligned cell is produced using the alignment layer and liquid crystal composition equivalent to those for the above panel, and measured for pre-tilt angle of the liquid crystal molecules by crystal rotation. The pre-tilt angle measured is about 0.1°.

The liquid crystal display is evaluated for quality of the images it produces in a manner similar to that for EXAMPLE 1. The images are confirmed to be of high quality, having a contrast ratio of above 600/1, almost on a level with that of the display produced in EXAMPLE 1, over the entire display area without showing light leakage caused by distorted alignment of the liquid crystal molecules in the vicinity of the electrode step, generally observed with a rubbing-aligned display. A wide viewing angle is also confirmed during the gradation display period.

The display is quantitatively evaluated for the image sticking/afterimage relaxation time in a manner similar to that for EXAMPLE 1. It is found that the afterimage relaxation time is 1 minute or less. The visual image quality/afterimage test also confirms high display characteristics, because uneven images resulting from image sticking/afterimages are not observed at all.

A liquid crystal display is produced in the same manner as in EXAMPLE 11, except that the alignment layer is irradiated with polarized ultraviolet ray (wavelength: 220 to 260 nm) at 3 J/cm² and unpolarized ultraviolet ray (wavelength: 260 to 400 nm) from another light source at 5 J/cm², and evaluated. It has display characteristics similar to the above.

Example 12

A liquid crystal alignment layer is provided in the same manner as in EXAMPLE 9 except for composition, type and photo-alignment treatment method by printing a polyamic acid varnish composed of a cinnamic acid ester (represented by the general formula [Compound 52]) as a diamine compound and 1,2,3,4-cyclobutanetetracarboxylic dianhydride (represented by the general formula [Compound 52]) as an acid dianhydride, and heated at 90° C. for 2 minutes for leveling. The resulting alignment layer is about 40 nm thick.

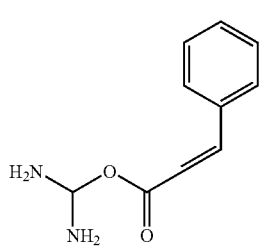

Compound 52

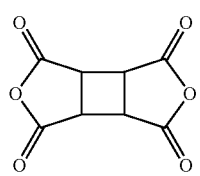

Compound 53

The alignment layer is then treated with polarized UV ray, at an irradiation energy of about 3 J/cm², emitted from a high-voltage mercury lamp, filtered by an interference filter and polarized by a pile polarizer of quartz to have a wavelength of 220 to 280 nm, while being irradiated with far-infrared ray to be kept at about 250° C. during the treatment for imidization and photo-alignment. The treated alignment layer is about 25 nm thick.

Then, the liquid crystal display of EXAMPLE 12 is produced in a manner similar to that for EXAMPLE 9. It is also illustrated in FIG. 5. Then, a nematic liquid crystal composition A is sealed in the display and annealed at 100° C. for 10 minutes. The liquid crystal molecules are well-aligned, essentially in parallel to the polarized light irradiation direction. The liquid crystal display has the liquid crystal layer having a thickness d of 4.0 μm.

A homogeneously aligned cell is produced using the alignment layer and liquid crystal composition equivalent to those for the above panel, and measured for pre-tilt angle of the liquid crystal molecules by crystal rotation. It is about 0.1°.

The liquid crystal display of EXAMPLE 12 is evaluated for quality of the images it produces in a manner similar to that for EXAMPLE 1. The images are confirmed to be of high quality, having a contrast ratio of above 600/1, almost on a level with that of the display produced in EXAMPLE 1, over the entire display area without showing light leakage caused by distorted alignment of the liquid crystal molecules in the vicinity of the electrode step, generally observed with a rubbing-aligned display. A wide viewing angle is also confirmed during the gradation display period.

The display of EXAMPLE 12 is quantitatively evaluated for the image sticking/afterimage relaxation time in a manner similar to that for EXAMPLE 1. It is found that the afterimage relaxation time is 1 minute or less over a service temperature range (0 to 50° C.). The visual image quality/afterimage test also confirms high display characteristics, because uneven images resulting from image sticking/afterimages are not observed at all.

Example 13

Figure 7:
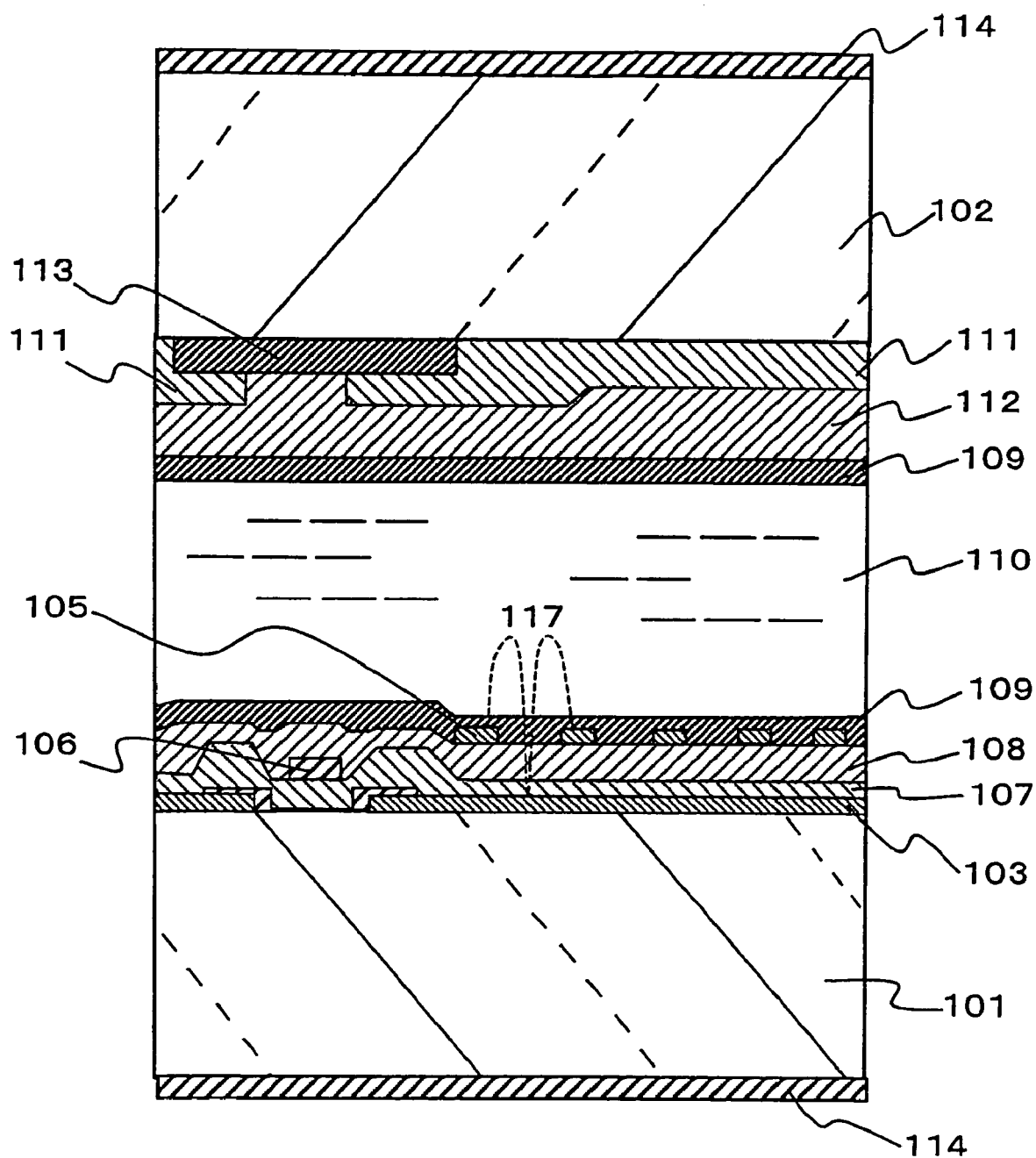
FIG. 7 is a cross-sectional view around the pixel for describing the pixel structure for the fifth embodiment of the liquid crystal display of the present invention.
Figure 8:
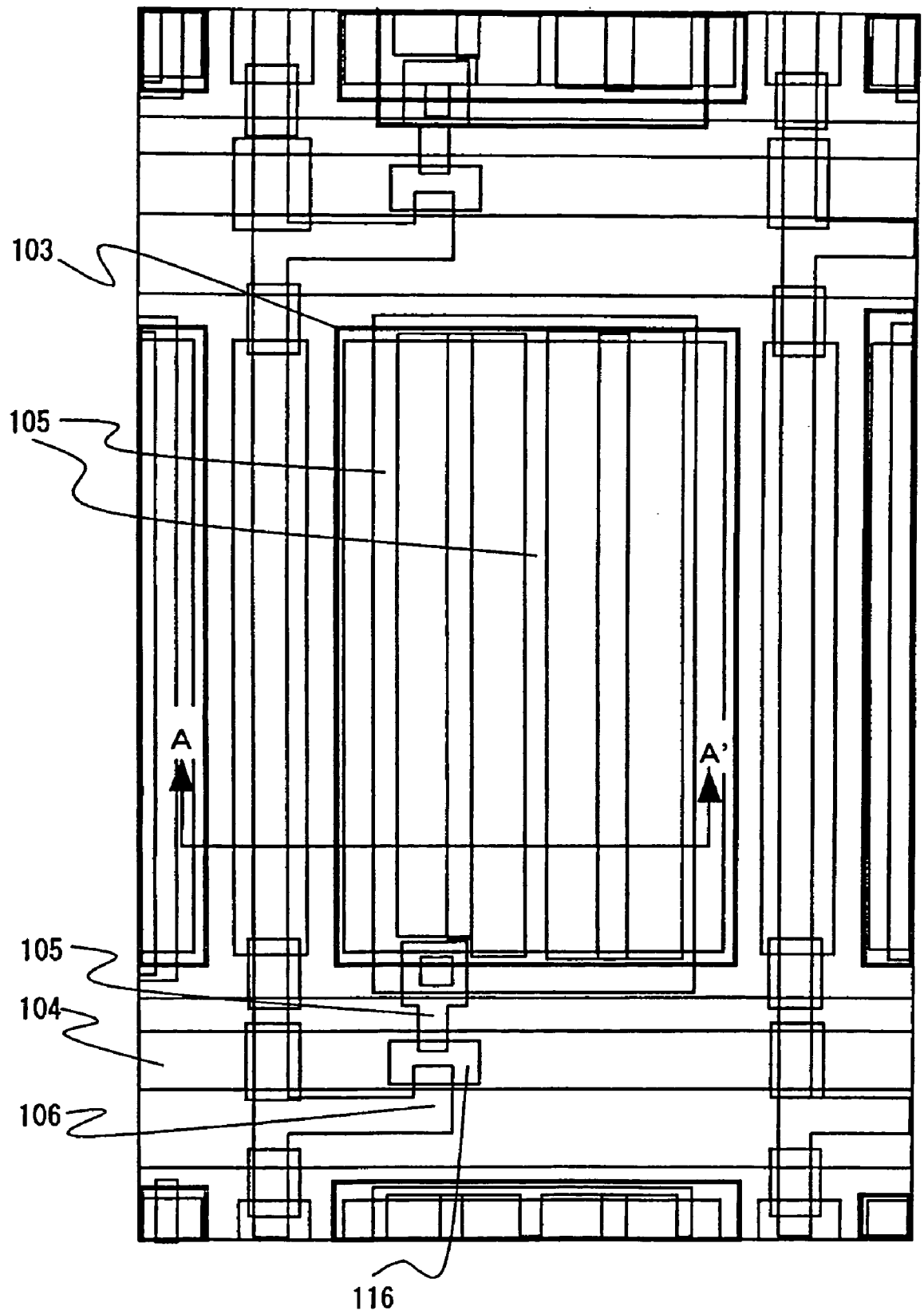
FIG. 8 is a plan view around the pixel for describing the pixel structure for the fifth embodiment of the liquid crystal display of the present invention.

Next, the specific liquid crystal display structure produced in EXAMPLE 13, which corresponds to the fifth embodiment of the present invention, is described by referring to FIGS. 7 and 8. For production of the liquid crystal display of EXAMPLE 13, a glass substrate surface-polished to a thickness of 0.7 mm is used for the substrate 101.

FIG. 7 schematically illustrates a cross-section of the display shown in FIG. 8, cut along the line A-A'. The TFT substrate is composed of the substrate 101 which carries the insulation film 107 and protective insulation film 108, the former for preventing a short-circuit at each of the electrodes 103, 105, 106 and 104, and the latter for protecting the thin-film transistor and electrodes 105 and 106.

FIG. 8 illustrates the thin-film transistor, and electrode 103, 105 and 106 structures. The thin-film transistor is composed of the source electrode (pixel electrode) 105, drain electrode (signal electrode) 106, gate electrode (scanning electrode) 104 and semiconductor film (of amorphous silicon) 116.

The scanning electrode 104 is made of an aluminum film, signal electrode 106 is made of a chromium film, and common electrode 103 and pixel electrode 105 are made of an ITO film, all patterned.

The insulation film 107 and protective insulation film 108 are made of silicon nitride, 0.2 and 0.3 μm thick, respectively. The capacitor is formed to have a structure with the insulation films 107 and 108 placed between the pixel electrode 105 and common electrode 103.

The pixel electrodes 105 are arranged to overlap each other on the upper side of the common electrode 103 of solid shape.

A total of 1024×3×768 pixels are formed by 1024×3 signal electrodes (for red, green and blue colors) and 768 scanning electrodes 104.

The color filter 111 with the black matrix 113, a structure similar to that for the liquid crystal display produced in EXAMPLE 1, is provided on the substrate 102 to form the opposite color filter substrate.

A liquid crystal alignment layer is provided on the active substrate by printing a polyamic acid varnish composed of 2,5-diaminopyridine (represented by the general formula [Compound 54]) and 1,2-diaminoethene (represented by the general formula [Compound 55]) as diamines (molar ratio: 3/1), and 1,2,3,4-cyclobutanetetracarboxylic dianhydride (represented by the general formula [Compound 56]) and 1,2,3,4-tetramethyl-1,2,3,4-cyclobutanetetracarboxylic dianhydride (represented by the general formula [Compound 57]) as dianhydrides (molar ratio: 2/1), adjusted to have a composition of resin (5%), NMP (60%) γ-butyllactone (20%) and butyl cellosolve (15%), all percentages by mass, and heated at 220° C. for 30 minutes for imidization. The resulting alignment layer 109 of polyimide is dense and about 110 nm thick.

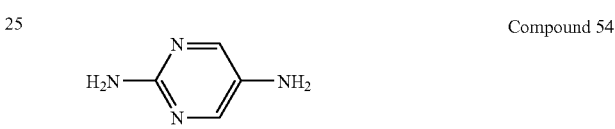

Compound 54

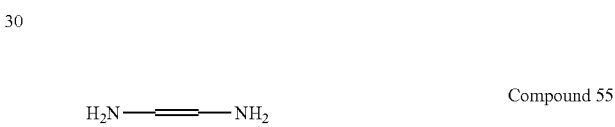

Compound 55

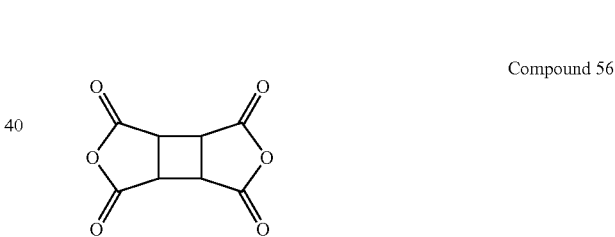

Compound 56

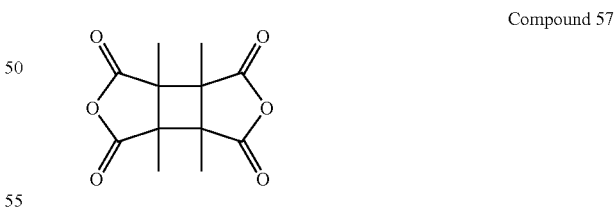

Compound 57

The other ITO-coated glass substrate 102 is coated with a polyamic acid varnish in a similar manner by printing, and heated at 220° C. for 30 minutes to produce the dense, about 110 nm thick alignment layer 109 of polyimide.

The alignment layer 109 of polyimide is irradiated with polarized ultraviolet ray (UV) at an irradiation energy of about 2 J/cm² to have a liquid crystal alignment capacity on the surface, where light emitted from a high-voltage mercury lamp as the light source is filtered by an interference filter to have ultraviolet ray (wavelength: 240 to 380 nm), which is then linearly polarized by a laminate of quartz plates as a pile polarizer to have a polarization ratio of about 10/1. The alignment layer is kept at about 120° C. during the treatment.

It is found that the liquid crystal molecules on the alignment layer surface are aligned at a right angle to the UV polarization direction.

The alignment layer 109 on the TFT substrate and that on the color filter substrate are aligned in parallel to each other, and slanted at 15° to the applied electrical field 117 direction. These two substrates are set with a spacer of dispersed spherical polymer beads having an average particle diameter of 4 μm in-between to hold the liquid crystal molecules 110 in the liquid crystal composition A as in EXAMPLE 1.

The two polarizer plates 114 holding the TFT substrate and color filter substrate are arranged in a cross nicol manner. Normally closed characteristics, displaying dark images at a low voltage and bright images at a high voltage, are adopted.

The system for driving the liquid crystal display of EXAMPLE 13 of the present invention is structurally similar to that for the display produced in EXAMPLE 1, and its detailed description is omitted.

The liquid crystal display of EXAMPLE 13 of the present invention is evaluated for quality of the images it produces. It is confirmed to have a higher aperture ratio than the display of EXAMPLE 1, produce high-quality images having a contrast ratio of 650/1, and have a wide viewing angle during the gradation display period.

The display is quantitatively evaluated for the image sticking/afterimage relaxation time in a manner similar to that for EXAMPLE 1. It is found that the afterimage relaxation time is about 1 minute over a service temperature range (0 to 50° C.). The visual image quality/afterimage test also confirms high display characteristics as in EXAMPLE 1, because uneven images resulting from image sticking/afterimages are not observed at all.

The display is also found to have an anchoring energy A2 of about $1.0 \times 10^{-3}$ N/m, determined in a manner similar to that for EXAMPLE 1, in the azimuthal angle direction of the film in which the liquid crystal molecules are aligned.

It should be further understood by those skilled in the art that although the foregoing description has been made on embodiments of the invention, the invention is not limited thereto and various changes and modifications may be made without departing from the spirit of the invention and the scope of the appended claims.

ADVANTAGE OF THE INVENTION

As discussed above, the present invention can provide a liquid crystal display which can solve problems resulting from narrow production margin for alignment treatment as an inherent disadvantage involved in IPS-TFT-LCDs, reduce unsatisfactory display caused by distorted initial alignment direction, realize stable liquid crystal alignment, and produce high-quality images of higher contrast ratio.

The invention claimed is:
1. A liquid crystal display comprising:
a pair of substrates;
a liquid crystal layer placed between a pair of the electrodes;
electrodes provided on at least one of the substrates to apply an electrical field to the liquid crystal layer;
active elements each connected to each of the electrodes; and
a photo-reactive alignment layer placed between the liquid crystal layer and at least one of the substrates, wherein the electrodes include a common electrode and a source electrode, the common electrode or the source electrode is formed on an insulation film, the photo-reactive alignment layer is formed on the insulation layer and the common electrode or the source electrode, a polarized light used for alignment treatment of the photo-reactive alignment layer has a light wavelength of 200 to 400 nm, the photo-reactive alignment layer contains a polyamic acid or polyimide composed of cyclobutanetetracarboxylic dianhydride or a derivative thereof, and diamine compound;

the cyclobutanetetracarboxylic dianhydride or derivative thereof contains at least one species selected from the group consisting of those represented by the general formulae [Compound 1] to [Compound 3]:

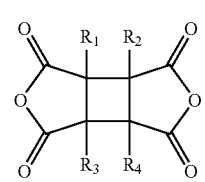

Compound 1

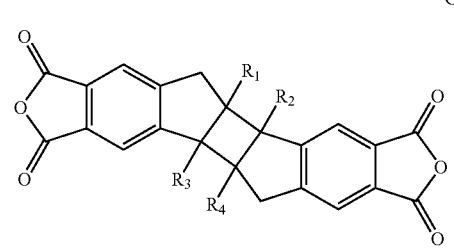

Compound 2

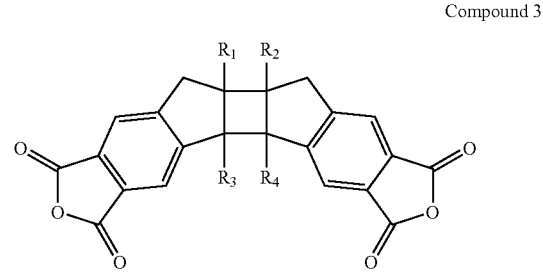

Compound 3

(wherein, $R_1$ to $R_4$ are independently hydrogen, fluorine, chlorine or bromine atom, phenyl group, an alkyl group or alkoxy group of 1 to 6 carbon atoms, vinyl group [—$(CH_2)_m$—CH=$CH_2$, m is 0, 1 or 2] or acetylene group [—$(CH_2)_m$—C≡CH, m is 0, 1 or 2]);

the diamine compound contains at least one species selected from the group consisting of those represented by the general formulae [Compound 5] to [Compound 18] and [Compound 21] to [Compound 22]:

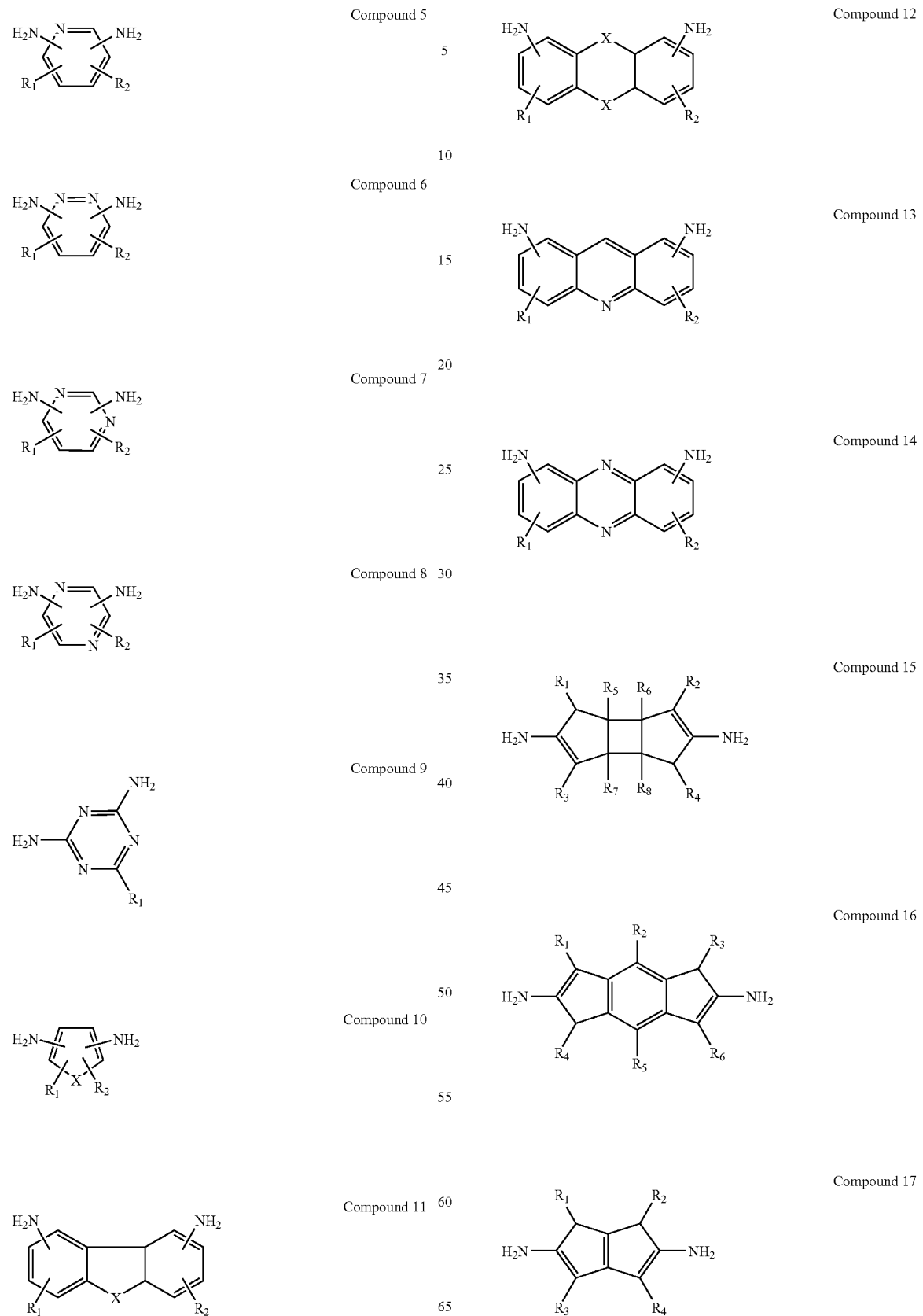

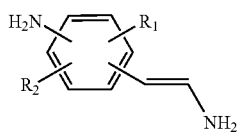
Compound 18

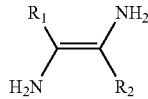
Compound 19

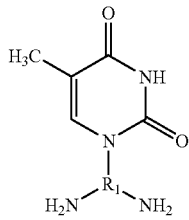
Compound 21

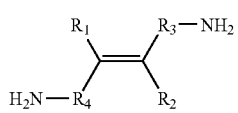
Compound 20

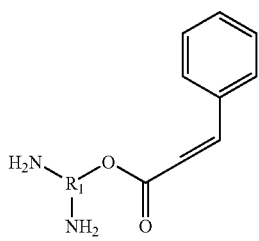
Compound 22

(wherein, $R_1$ to $R_8$ for Compounds 5 to 18 are independently hydrogen, fluorine or chlorine atom, an alkyl group or alkoxy group of 1 to 6 carbon atoms, vinyl group [—$(CH_2)_m$—CH=$CH_2$, m is 0, 1 or 2] or acetylene group [—$(CH_2)_m$—CH≡CH, m is 0, 1 or 2]; X for Compounds 10 to 12 is —$CH_2$—, —NH—, —CO—, —O— or —S— as a coupling group; and $R_1$ for Compounds 21 and 22 are independently an alkyl group of 1 to 6 carbon atoms).

2. The liquid crystal display according to claim 1, wherein the photo-reactive alignment layer is 1 to 100 nm thick.

3. The liquid crystal display according to claim 1, wherein the photo-reactive alignment layer provided on the electrodes is 1 to 50 nm thick.

4. The liquid crystal display according to claim 1, wherein the photo-reactive alignment layer provided on the electrodes is 1 to 30 nm thick.

5. The liquid crystal display according to claim 1, wherein the source electrode and the common electrode opposite thereto are set in parallel to each other, and have a bent structure.

6. The liquid crystal display according to claim 1 wherein the diamine compound contains at least one species selected from the group consisting of those represented by the general formulae [Compound 5] to [Compound 18] and [Compound 21] to [Compound 22] according to claim 1 and contains at least one species selected from the group consisting of those represented by the general formulae [Compound 19] and [Compound 20]:

(wherein, $R_1$ and $R_2$ for Compound 19 and Compound 20 are independently hydrogen, fluorine or chlorine atom, an alkyl group or alkoxy group of 1 to 6 carbon atoms, vinyl group [—$(CH_2)_m$—CH=$CH_2$, m is 0, 1 or 2] or acetylene group [—$(CH_2)_m$—CH≡CH m is 0, 1 or 2]; and $R_3$ and $R_4$ for Compound 20 are independently an alkyl group of 1 to 6 carbon atoms).

7. The liquid crystal display according to claim 1, wherein the cyclobutanetetracarboxylic dianhydride or derivative thereof contains at least one species selected from the group consisting of those represented by the general formula [Compound 1] to [Compound 3] according to claim 1 and contains at least one species selected from the group consisting of those represented by the general formulae [Compound 1]:

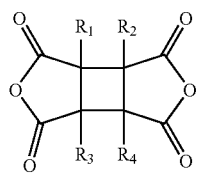
Compound 1

(wherein, $R_1$ to $R_4$ are independently hydrogen, fluorine, chlorine or bromine atom, phenyl group, an alkyl group or alkoxy group of 1 to 6 carbon atoms, vinyl group [—$(CH_2)_m$—CH=$CH_2$, m is 0, 1 or 2] or acetylene group [—CH$(CH_2)_m$—C≡CH, m is 0, 1 or 2]).

8. A liquid crystal display comprising:
a pair of substrates;
a liquid crystal layer placed between a pair of the electrodes;
electrodes provided on at least one of the substrates to apply an electrical field to the liquid crystal layer;
active elements each connected to each of the electrodes; and
a photo-reactive alignment layer placed between the liquid crystal layer and at least one of the substrates,
wherein the electrodes include a common electrode and a source electrode,
the common electrode or the source electrode is formed on an insulation film,
the photo-reactive alignment layer is formed on the insulation layer and the common electrode or the source electrode,
the polarized light used for the alignment treatment of the photo-reactive alignment layer has a light wavelength of 200 to 400 nm, the photo-reactive alignment layer contains a polyamic acid or polyimide composed of cyclobutanetetracarboxylic dianhydride or a derivative thereof and diamine compound, the cyclobutanetetracarboxylic dianhydride or derivative thereof contains at least one species selected from the group consisting of those represented by the general formulae [Compound 1] to [Compound 3]:

(wherein, $R_1$ to $R_4$ are independently hydrogen, fluorine, chlorine or bromine atom, phenyl group, an alkyl group or alkoxy group of 1 to 6 carbon atoms, vinyl group [—$(CH_2)_m$—CH=$CH_2$, m is 0, 1 or 2] or acetylene group [—$(CH_2)_m$—CH≡CH, m is 0, 1 or 2]), the diamine compound contains at least one species selected from the group consisting of those represented by the general formulae [Compound 4] to [Compound 18], [Compound 21] to [Compound 22] and [Compound 44]:

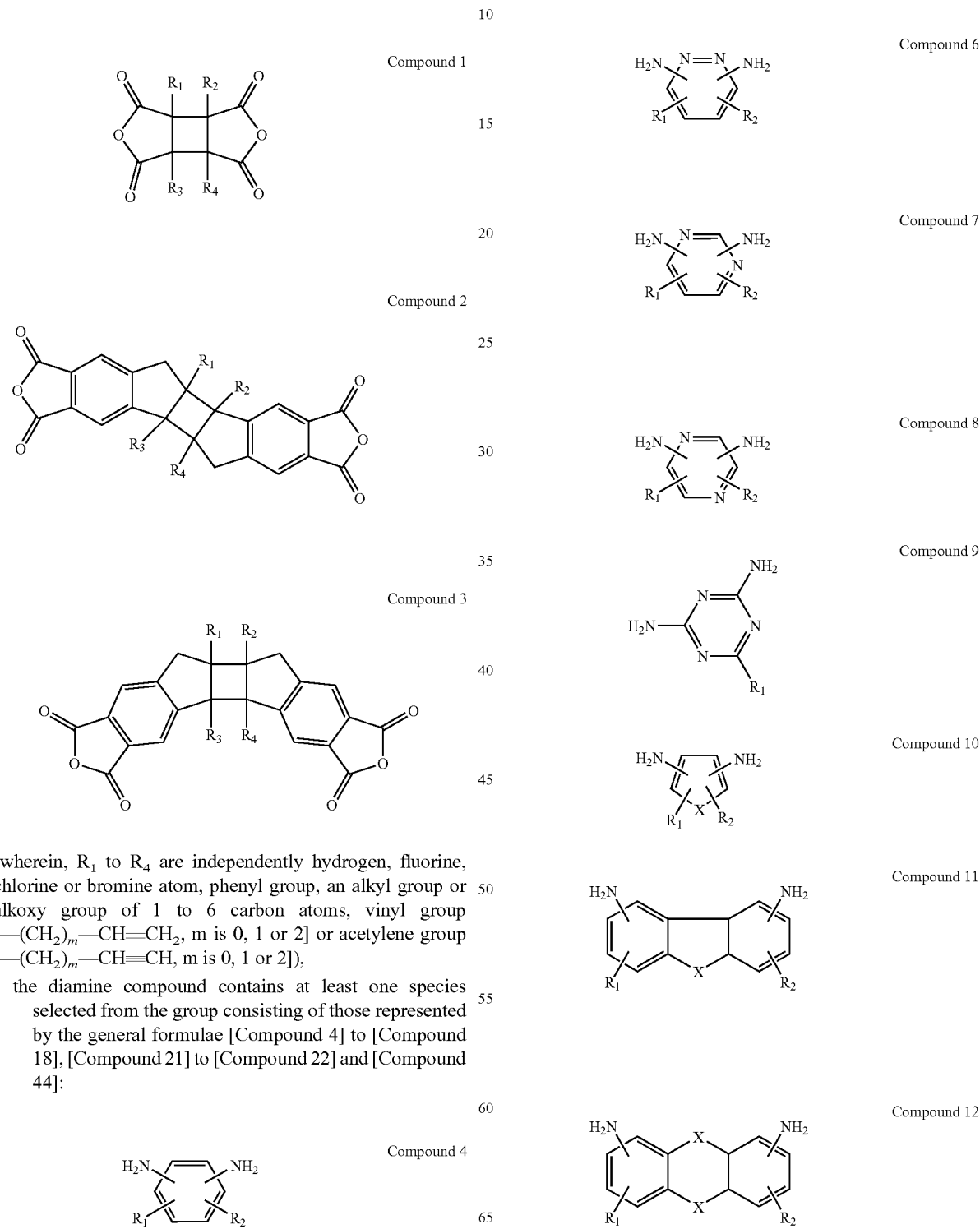

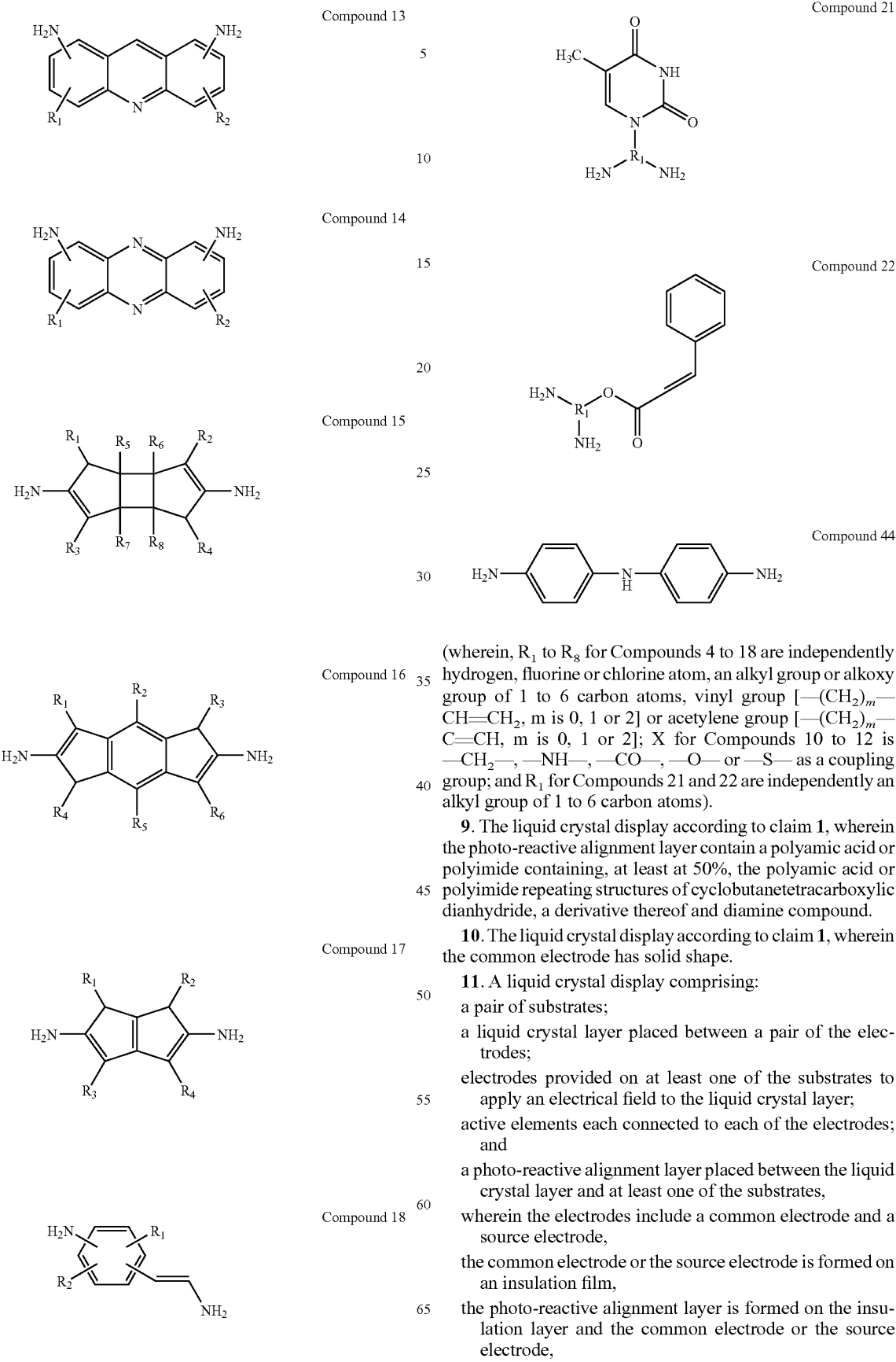

(wherein, $R_1$ to $R_8$ for Compounds 4 to 18 are independently hydrogen, fluorine or chlorine atom, an alkyl group or alkoxy group of 1 to 6 carbon atoms, vinyl group [—$(CH_2)_m$—CH=$CH_2$, m is 0, 1 or 2] or acetylene group [—$(CH_2)_m$—C≡CH, m is 0, 1 or 2]; X for Compounds 10 to 12 is —$CH_2$—, —NH—, —CO—, —O— or —S— as a coupling group; and $R_1$ for Compounds 21 and 22 are independently an alkyl group of 1 to 6 carbon atoms).

9. The liquid crystal display according to claim 1, wherein the photo-reactive alignment layer contain a polyamic acid or polyimide containing, at least at 50%, the polyamic acid or polyimide repeating structures of cyclobutanetetracarboxylic dianhydride, a derivative thereof and diamine compound.

10. The liquid crystal display according to claim 1, wherein the common electrode has solid shape.

11. A liquid crystal display comprising:
a pair of substrates;
a liquid crystal layer placed between a pair of the electrodes;
electrodes provided on at least one of the substrates to apply an electrical field to the liquid crystal layer;
active elements each connected to each of the electrodes; and
a photo-reactive alignment layer placed between the liquid crystal layer and at least one of the substrates,
wherein the electrodes include a common electrode and a source electrode,
the common electrode or the source electrode is formed on an insulation film,
the photo-reactive alignment layer is formed on the insulation layer and the common electrode or the source electrode, a polarized light used for alignment treatment of the photo-reactive alignment layer has a light wavelength of 200 to 400 nm, the photo-reactive alignment layer contains a polyamic acid or polyimide composed of cyclobutanetetracarboxylic dianhydride or a derivative thereof and diamine compound, the cyclobutanetetracarboxylic dianhydride or derivative thereof contains at least one species selected from the group consisting of those represented by the general formulae [Compound 2] or [Compound 3]:

Compound 2

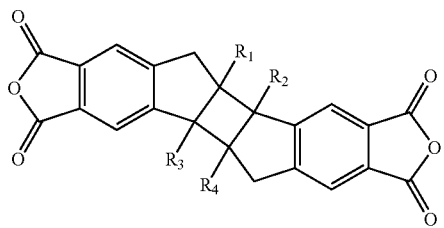

Compound 3

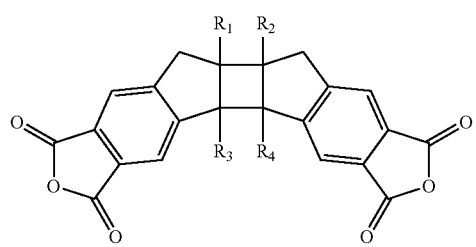

(wherein, $R_1$ to $R_4$ are independently hydrogen, fluorine, chlorine or bromine atom, phenyl group, an alkyl group or alkoxy group of 1 to 6 carbon atoms, vinyl group [—$(CH_2)_m$—CH=$CH_2$, m is 0, 1 or 2] or acetylene group [—CH$(CH_2)_m$—C≡CH, m is 0, 1 or 2], the diamine compound contains at least one species selected from the group consisting of those represented by the general formulae [Compound 4] to [Compound 22]:

Compound 4

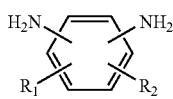

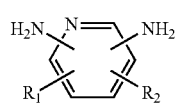

Compound 6

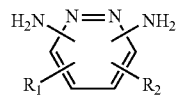

Compound 7

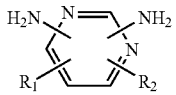

Compound 8

Compound 9

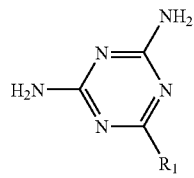

Compound 10

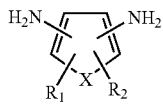

Compound 11

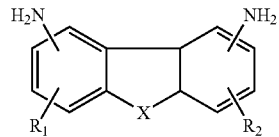

Compound 12

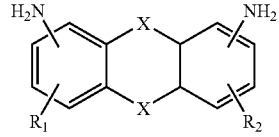

Compound 13

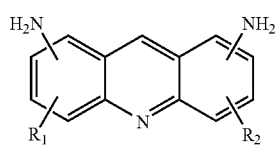

Compound 19

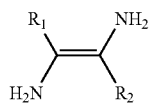

Compound 14

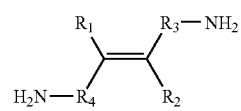

Compound 20

Compound 15

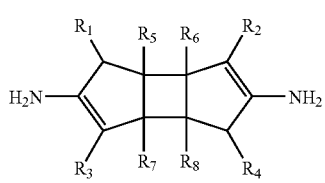

Compound 21

Compound 16

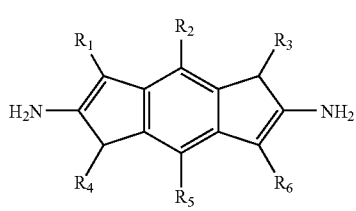

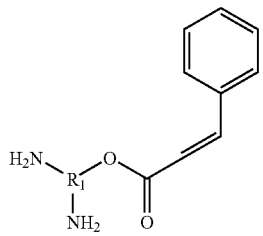

Compound 22

Compound 17

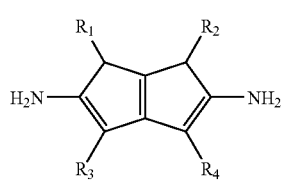

Compound 18

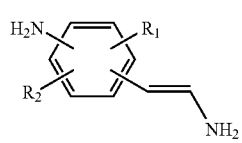

(wherein $R_1$ to $R_8$ for Compounds 5 to 18 are independently hydrogen, fluorine or chlorine atom, an alkyl group or alkoxy group of 1 to 6 carbon atoms, vinyl group [—$(CH_2)_m$—CH=$CH_2$, m is 0, 1 or 2] or acetylene group [—CH$(CH_2)_m$—C≡CH, m is 0, 1 or 2]; X for Compounds 10 to 12 is —$CH_2$—, —NH—, —CO—, —O— or —S— as a coupling group; and $R_1$ for Compounds 21 and 22 are independently an alkyl group of 1 to 6 carbon atoms); $R_1$ and $R_2$ for Compounds 4, 19 and 20 are independently hydrogen, fluorine or chlorine atom, an alkyl group or alkoxy group of 1 to 6 carbon atoms, vinyl group [—$(CH_2)_m$—C=CH, m is 0, 1 or 2] or acetylene group [—$(CH_2)_m$—C≡CH, m is 0, 1 or 2]; and $R_3$ and $R_4$ for Compound 20 are independently an alkyl group of 1 to 6 carbon atoms).

\* \* \* \* \*